(12) United States Patent
Sullivan et al.

(10) Patent No.: US 11,270,396 B1
(45) Date of Patent: *Mar. 8, 2022

(54) AUTOMATED EVENT SPACE MANAGEMENT WITH CONFLICT PREVENTION

(71) Applicant: MapYourShow, LLC, Cincinnati, OH (US)

(72) Inventors: John Sullivan, Crestview Hills, KY (US); Drew Martin, Arvada, CO (US); Julie Baker, Cincinnati, OH (US)

(73) Assignee: MapYourShow, LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,036

(22) Filed: May 13, 2021

Related U.S. Application Data

(63) Continuation of application No. 17/097,227, filed on Nov. 13, 2020.

(51) Int. Cl.
*G06Q 10/00* (2012.01)
*G06Q 50/16* (2012.01)
(Continued)

(52) U.S. Cl.
CPC .......... *G06Q 50/163* (2013.01); *G01S 19/51* (2013.01); *G06F 16/29* (2019.01); *G06Q 10/02* (2013.01);
(Continued)

(58) Field of Classification Search
None
See application file for complete search history.

(56) References Cited

U.S. PATENT DOCUMENTS 6,285,369 B1 * 9/2001 Kross .................. G06T 19/00
345/419
6,922,701 B1 * 7/2005 Ananian .............. G06F 30/13
(Continued)

OTHER PUBLICATIONS

James Harty and Richard Laing (Facilitating Meaningful Collaboration in Architectural Design through the adoption of BIM (Building Information Modelling), 2013 IEEE). (Year: 2013).*

(Continued)

*Primary Examiner* — Hafiz A Kassim
(74) *Attorney, Agent, or Firm* — Ulmer & Berne LLP

(57) ABSTRACT

A system provides interactive and automated features to aid in planning, management, and execution of events within venues. Venue hardscapes are geolocated, parsed, and stored to be used when configuring events. During event configuration a venue softscape may be automatically generated and applied to the venue hardscape to produce an initial layout. The initial layout may be modified to create and assign booths to exhibitors by multiple coordinators in parallel. Geolocation of hardscaped may be extended into softscapes, such that location data may be maintained for temporary structures such as booths. Conflicts may be avoided by implementing one or more conflict prevention features, including enforcement of universal layouts, booth locking, synchronous session management, automatic identifier assignment to preserve locational correspondence, booth and layout validation, and others. The system also provides interfaces to event staff and attendees that may include features for inter-venue and intra-venue navigation, crowd management, and emergency response.

17 Claims, 13 Drawing Sheets

(51) Int. Cl.
*G06F 16/29* (2019.01)
*G06Q 10/02* (2012.01)
*G06Q 50/26* (2012.01)
*G06Q 10/06* (2012.01)
*G01S 19/51* (2010.01)
*H04L 67/55* (2022.01)
*G06Q 10/10* (2012.01)
*G06F 3/04847* (2022.01)

(52) U.S. Cl.
CPC ..... *G06Q 10/06315* (2013.01); *G06Q 10/103* (2013.01); *G06Q 50/26* (2013.01); *H04L 67/26* (2013.01); *G06F 3/04847* (2013.01)

(56) References Cited

U.S. PATENT DOCUMENTS

| | | | | |
|---|---|---|---|---|
| 9,980,112 | B1* | 5/2018 | Newby | H04W 4/029 |
| 2001/0014865 | A1* | 8/2001 | Franke | G06Q 40/04 |
| | | | | 709/204 |
| 2003/0155413 | A1* | 8/2003 | Kovesdi | G06F 16/954 |
| | | | | 235/375 |
| 2003/0156135 | A1* | 8/2003 | Lucarelli | G06Q 30/02 |
| | | | | 715/757 |
| 2005/0081161 | A1* | 4/2005 | MacInnes | G06K 9/00 |
| | | | | 715/765 |
| 2006/0241793 | A1* | 10/2006 | Skourup | G06F 3/04815 |
| | | | | 700/83 |
| 2006/0242154 | A1* | 10/2006 | Rawat | G06F 16/168 |
| 2007/0219645 | A1* | 9/2007 | Thomas | G05B 15/02 |
| | | | | 700/29 |
| 2008/0059220 | A1* | 3/2008 | Roth | G06Q 30/018 |
| | | | | 705/311 |
| 2008/0068473 | A1* | 3/2008 | Ryckman | G07F 17/3206 |
| | | | | 348/239 |
| 2008/0109759 | A1* | 5/2008 | Stambaugh | G06F 3/0481 |
| | | | | 715/835 |
| 2008/0312946 | A1* | 12/2008 | Valentine | G06Q 30/02 |
| | | | | 705/64 |
| 2009/0144143 | A1* | 6/2009 | Iyer | G06Q 30/02 |
| | | | | 705/14.52 |
| 2010/0228602 | A1* | 9/2010 | Gilvar | G06Q 30/0252 |
| | | | | 705/14.5 |
| 2011/0130636 | A1* | 6/2011 | Daniel | G08B 21/02 |
| | | | | 600/301 |
| 2012/0116728 | A1* | 5/2012 | Shear | G06T 19/006 |
| | | | | 703/1 |
| 2012/0320058 | A1* | 12/2012 | Stephen | G06T 15/20 |
| | | | | 345/428 |
| 2014/0172378 | A1* | 6/2014 | Shim | G06F 30/13 |
| | | | | 703/1 |
| 2014/0358632 | A1* | 12/2014 | Graff | G06Q 30/0224 |
| | | | | 705/7.29 |
| 2015/0271218 | A1* | 9/2015 | Steingrimsson | G06Q 10/101 |
| | | | | 709/204 |
| 2017/0132568 | A1* | 5/2017 | Glunz | G06Q 10/101 |
| 2020/0082029 | A1* | 3/2020 | Hartfiel | G06F 30/13 |
| 2020/0387838 | A1* | 12/2020 | Stam | G06F 16/9538 |

OTHER PUBLICATIONS

Svenja Kahn, Manuel Olbrich, Timo Engelke, Jens Keil, Patrick Riess, Sabine Webel, Holger Graf, Ulrich Bockholt, and Guillaume Picinbono (Beyond 3D "as-Built" Information using Mobile AR enhancing the Building Lifecycle Management, 2013 IEEE). (Year: 2013).*

* cited by examiner

AUTOMATED EVENT SPACE MANAGEMENT WITH CONFLICT PREVENTION

PRIORITY

This application claims priority to U.S. Provisional Patent App. No. 62/935,299, filed Nov. 14, 2019, entitled "Automated Event Space Management with Conflict Prevention" and U.S. Non-Provisional patent application Ser. No. 17/097,227, filed Nov. 13, 2020, also entitled "Automated Event Space Management with Conflict Prevention" the disclosure of which are hereby incorporated by reference in their entirety.

FIELD

The disclosed technology pertains to a system for automatically managing event space.

BACKGROUND

When preparing for conferences, conventions, exhibitions, and other similar events there is a significant requirement for planning, expertise, and setup to ensure smooth execution. From the perspective of an event manager, an event space must be selected and prepared to meet the needs of the event and to meet local, state, or federal laws or regulations. This may include assigning particular areas within the event space to particular vendors, exhibitors, or attractions, arranging tables or booths so that fire exits are clear and visible, ensuring that walking paths are wide enough for regulatory compliance, identifying nearby parking areas or other transit options, ensuring that any needed resources or connections are available for each table or booth (e.g., electric, water, exhaust vents), and other considerations.

As such details are planned, they must be communicated to exhibitors, attendees, contractors responsible for setting up booths, facility or event space managers, and other parties. Errors in planning may vary in magnitude from slight inefficiencies in the use of the event space (e.g., a sub-optimal arrangement of booths, a need for lengthy electrical connection cabling) to complete cancellation of the event (e.g., a violation of fire or safety code uncovered on the day of the event with no time to address). Even where errors in planning may be addressed prior to the date of the event, communicating such changes out to each involved party can result in a chaotic mix of miscommunication and misinformation which can lead to further errors.

With some event spaces being nearly a million square feet in size and accommodating more than ten thousand attendees, it can be seen that such planning may be highly complex, which further increases the possibility for errors in the management of the space. Errors may also arise relating to assignment of booth space to individual exhibitors, which may include scenarios where the same booth space is assigned to two different exhibitors by separate coordinators, scenarios where exhibitors mistakenly set up in a booth space assigned to another exhibitor, scenarios where available booth spaces change in size or location and are not distributed out to coordinators, and other scenarios. With the complexity of planning and number of parties involved, it can be seen that there is a high potential for error.

What is needed, therefore, is an improved system for managing event space.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of event space management. While the disclosed applications of the inventors' technology satisfy a long-felt but unmet need in the art of event space management, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Figure 1:
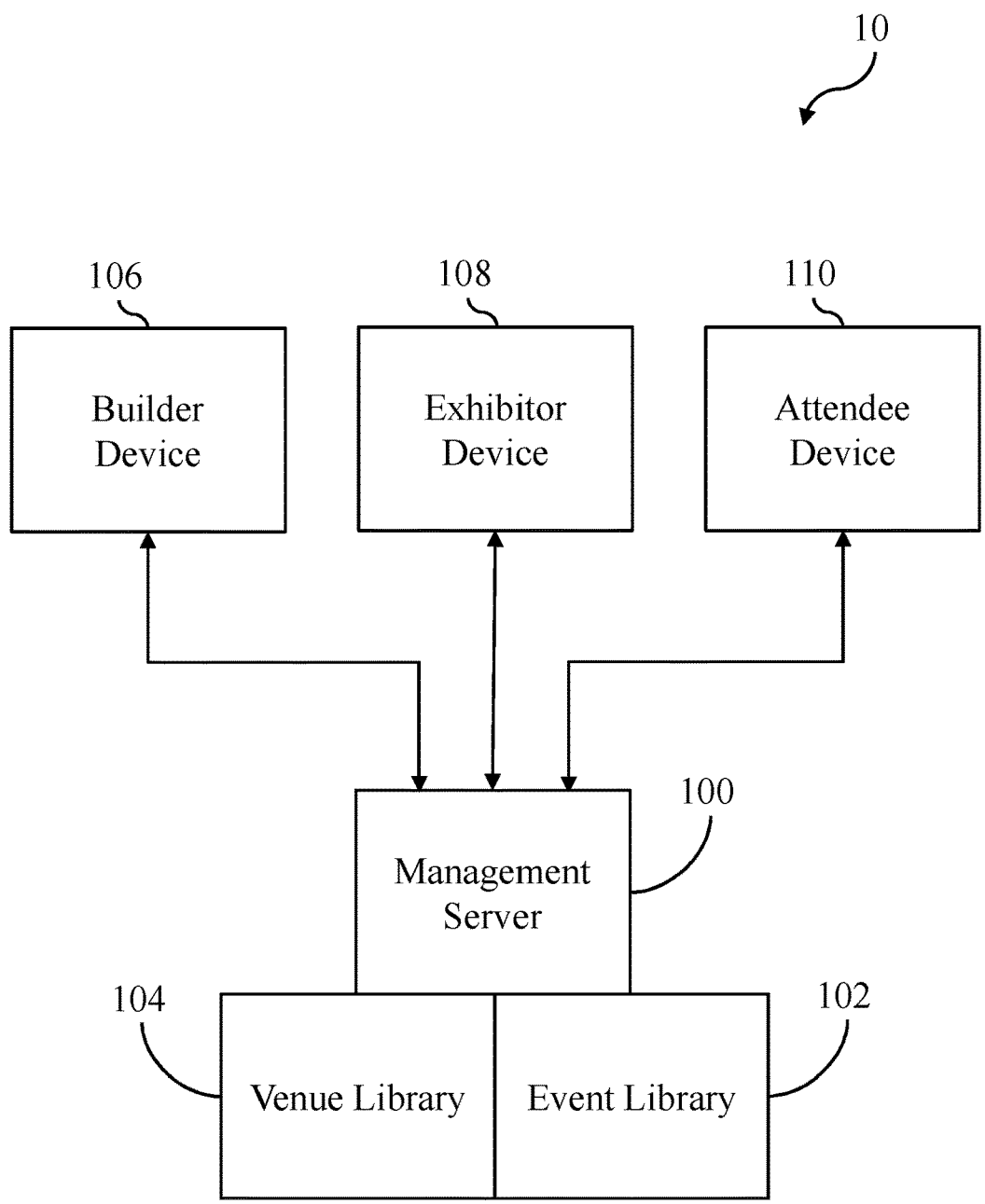
FIG. 1 is a schematic diagram of an exemplary system configured to manage event space.

Turning now to the figure, FIG. 1 shows a schematic diagram of an exemplary system (10) configured to manage event space, including automated management features and conflict prevention. Features and functions of the system (10) allow users to manage various aspects of planning, preparation, and execution of events within venues such as large event spaces. Various implementations of the system (10) may allow users to view venue hardscapes (e.g., static structural features of venues such as walls, doors, stairs, columns, utility access points, and other features), automatically and manually configure venue softscapes (e.g., dynamic features of venues such as the size, shape, and position of booths within a venue), assign booths to particular vendors or exhibitors, provide and view geolocation and navigational features between interior and exterior spaces, and utilize conflict prevention features to allow management of the venue by multiple parties in parallel, as will be described in more detail below.

The system (10) includes a management server (100) configured to provide interfaces and features to client devices and to manage, update, and access a venue library (104) and an event library (102). The management server (100) may be one or more physical servers, virtual servers, cloud servers, or other server environments, with individual servers comprising one or more processors, memories, communication devices and other components, as will be apparent to those of ordinary skill in the art in light of this disclosure.

The venue library (104) may be a database or other structure storing a dataset of venue hardscape information, which may include files or data describing various static or semi-static aspects of venue spaces such as walls, doors, stairways, electrical outlets, fire safety features, and restrooms. As an example, the venue library (104) may store CAD files, architectural diagrams, PDFs, or other files describing such features of a venue, or may store data objects that are manually configured or parsed from such files, or may store both.

Figure 10:
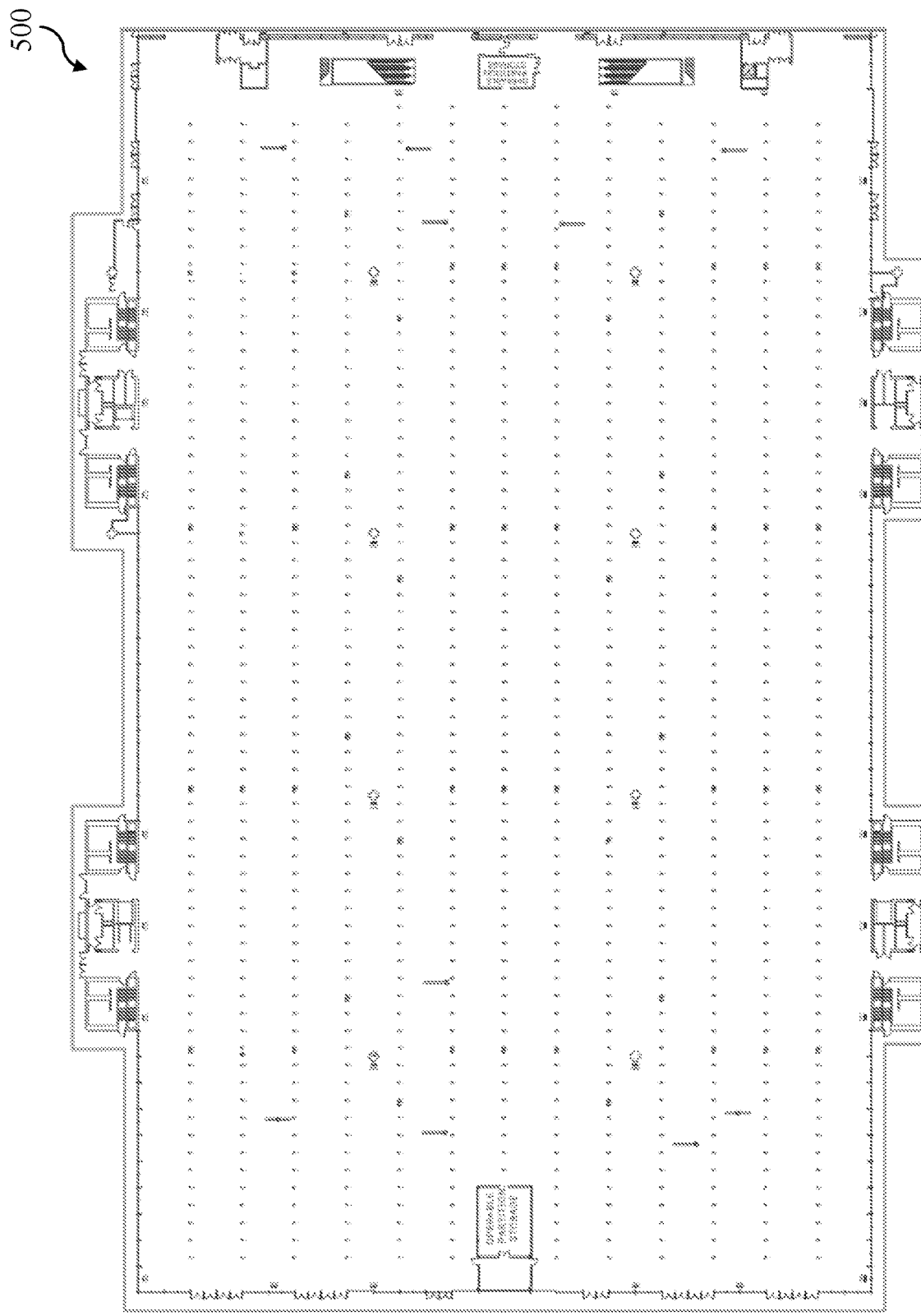
FIG. 10 is a schematic diagram illustrating an exemplary venue hardscape.

FIG. 10 shows an exemplary venue hardscape (500) such as may be produced from a CAD file or other data file. The hardscape (500) includes depictions of walls, doors, stairways, rooms, fire safety equipment, and other static features. Some hardscapes may also identify electrical outlets, water supplies, ventilation ports, and other static resources or utilities. Some hardscapes may also include text notes, descriptions, or text keys identifying and/or describing aspects of the hardscape. Some hardscapes may also include metadata indicating scale of the venue, location of the venue, name of the venue, and safety or regulatory requirements or limitations of the venue. Some hardscapes may also include partial or complete softscape information, such as where a particular hardscape is associated with a default booth arrangement.

As an example of one default booth arrangement, some hardscapes may include a "max-fit" arrangement of booths, which includes the placement of booths of a standard shape and size (e.g., square booths of 100 square feet) along predetermined rows that maximize the number of booths while still meeting all other safety requirements and specifications (e.g., a max-fit arrangement will not block fire safety equipment or exits, will not block or provide narrow walkways, and may also ensure that each booth has a certain number of electrical outlets). Various aspects of the hardscape may be configured as individual features or layers, and so may be parsed and identified separately. In some implementations, the system (10) may also be configured to identify and parse layers from flat hardscapes (e.g., two dimensional images of hardscapes not associated with metadata) using image analysis and recognition, as will be apparent to those of ordinary skill in the art in light of this disclosure. Once available as individual layers, such features may be selectively viewed, applied, or manipulated (e.g., a fire safety layer may be selected to highlight all fire safety features, a default softscape view may be selected and applied to the hardscape or disabled and removed).

The event library (102) may be a database or other structure storing a dataset of venue softscape information, which may include files or data describing various dynamic aspects of venue spaces and the events that they are associated with, such as the size, shape, and position of booths, parties that booths are assigned to, the type of product or service being sold or exhibited at booths, dates, times and descriptions of an event being held at the venue, as well as other characteristics that may be optionally associated with a particular event at a venue. The combination of venue hardscape and venue-event softscape datasets may be referred to as a layout, and may provide an indication of where, within the static structure of a venue, the temporary features (e.g., booths, walking paths, designated entrances and exits) will be located during the execution of the associated event.

Client devices in communication with the management server may include computers, laptops, smartphones, tablets, and other computing devices including processors, memories, communication devices, displays, user input devices, and other components as will be apparent to those of ordinary skill in the art in light of this disclosure. Client devices may include a builder device (106) that is usable to display and interact with interfaces of the management server (100) to view and manage venue hardscapes and other information in the venue library (104), to view and manage venue softscapes (e.g., creating and positioning booths) and other information in the event library (102), and to view and manage other information gathered by the system (10), as will be described in more detail below.

An exhibitor device (108) may be usable by event staff and others involved with the execution of the event, which may also include contractors responsible for setting up booths and other softscape features, vendors and exhibitors that have obtained a booth for an event, police officers or other security personnel present at the event. Interfaces provided to the exhibitor device (108) by the management server (100) may provide various information on the venue hardscape and softscape, including information not available to attendees of the event, and may include contact information associated with each booth, traffic maps or heatmaps showing attendees within the venue, locations of particular trackable devices within the venue, and other information. Such information provided by the exhibitor device (108) may vary based upon the particular user associated with the device. As an example, a security guard assigned to the event may have access to real time heatmap and crowd data for the venue, while an exhibitor assigned to a booth may not.

An attendee device (100) may be usable by attendees of an event at the venue in order to view information related to the venue and the event, to filter and search booths, and to access additional features offered by the system (10), which may include providing maps or navigation within the venue (e.g., from a booth to a nearby restroom), navigation between venue spaces (e.g., such as where an event may be spread across two or more separate structures separated by walking spaces or streets), and navigation to venues (e.g., from a hotel, home, or other origin, and may include navigation to designated parking or other transport options, and navigation to a designated entrance).

Client devices may access interfaces and information from the management server (100) in various ways and may include, for example, configuring a software application (e.g., a mobile application), accessing a website, or accessing another data channel or interface. In some implementations, separate websites or applications may be provided for each device type (e.g., one for the builder device (106) and one for the exhibitor device (108)). In some implementations, a single application or website may be provided to all clients, with varying functionality and features being determined based upon a user's identification, login credentials, or other information. Such variations and others will be apparent to those of ordinary skill in the art in light of this disclosure.

Figure 2:
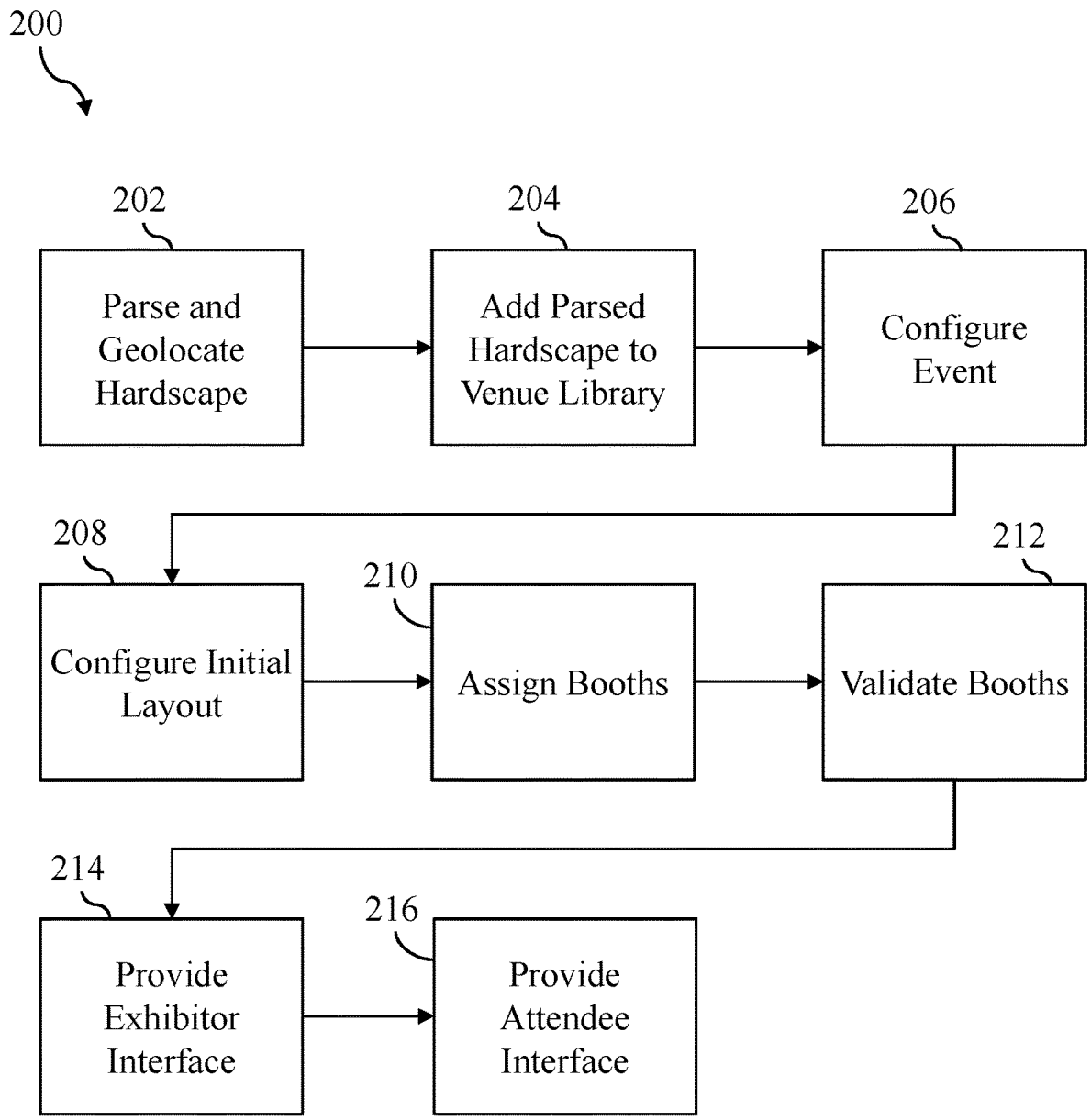
FIG. 2 is a flowchart of an exemplary set of high-level steps that a system could perform to manage event space.

FIG. 2 is a flowchart of an exemplary set of high-level steps (200) that a system could perform to manage event space. The system (10) may parse and geolocate (202) one or more venue hardscapes, which may include receiving user input or data files and parsing data into structured format. As one example, this could include receiving a CAD model or architectural diagram describing a venue and programmatically identifying features such as walls, doors, stairs, fire safety features, and utility features. The hardscape may also be geolocated relative to a geographic reference point, such as a global positioning system (GPS), which may be performed based upon information parsed from the input file or may be manually configured, for example. Once geolocated and parsed, particular features and components within the hardscape venue may themselves be geolocated. For example, where GPS coordinates are known for the venue itself, and the venue hardscape has been parsed to identify the position of a restroom within the venue and the venue scale, the known GPS coordinates can be used to provide GPS coordinates for the restroom.

Information associated with the parsed and geolocated hardscape may be added (204) to the venue library (104). In this manner, a venue hardscape may be originally added to the system, and then may only be updated when major changes or renovations result in changes to the venue hardscape. Once added (204) the venue hardscape and geolocation mapping may be immediately available to the system (10) and usable for subsequent event configurations.

Events may also be configured (206) based upon information provided by an administrator or user of the system and stored in the event library (102). This may include providing basic information relating to the event, such as the date and time, the topic, a venue that the event will be located at, speakers and schedules for the event, and other information. With an event configured (206) and associated with a particular venue, an initial layout may then be configured (208) and stored in the event library (102) by generating and applying or overlaying a venue softscape to the venue hardscape. The initial venue softscape may be manually configured (e.g., by using an interface to create and place booths within the hardscape or to create and place symbols indicating services or other points of interest within the hardscape) or may be automatically configured (e.g., by automatically creating and placing booths or other indicators using parsed information or configured criteria), as will be described in more detail below.

Booths may be assigned (210) to particular vendors, exhibitors, or other parties with such information being saved and associated with the layout. Assignment of booths may be performed by, for example, a user of the builder device (106) such as an event coordinator or other party responsible for advertising and securing reservations for booths and other event spaces. Layout configuration (208) and assignment of booths (210) may also include manual modification of booth sizes, shapes, and characteristics, as may be needed by a particular party reserving a booth. For example, where an exhibitor needs a particularly large booth space (e.g., 10,000 square feet) and a current layout does not provide such a space, a coordinator may delete or move booths currently on the layout in order to add a booth of the needed size.

Some events may have dozens of coordinators that are responsible for advertising and assigning booth space to exhibitors and are often promoting and reserving booths simultaneously and in parallel. Use of whiteboards, spreadsheets, email, and other means for managing available booth space across a team of coordinators may result in gaps and conflicts, such as where a coordinator is assigning booth space based upon expired information, which may result in double-booking of a booth space. To avoid such conflicts, some implementations of the system (10) may include conflict prevention features during the assignment (210) of booths, as will be described in more detail below.

As booths are assigned (210) or at regular intervals (e.g., based upon a schedule, based upon finalization of a layout), the layout may be validated (212) in order to verify booth placement, sizing, naming, and assignment and enforce various configured criteria. This may include ensuring minimum space between booths and around walkways, ensuring that fire safety features are not blocked, ensuring that other safety requirements are met (e.g., providing clear lines of sight to fire exits), ensuring that configured booth characteristics are possible based on its position (e.g., the booth is not too tall for its location, the booth requires a hardscape wall on one side, the booth is an island booth with four unobstructed softscape walls), and ensuring that booths have been clearly named or identified (e.g., assigned a unique number or identifying text). Conflicts during booth validation (212) may be flagged or identified and, in some implementations, changes or fixes may be proposed and automatically applied in response to user input.

As has been discussed, the system (10) provides information and features to client devices through various interfaces. For example, assigning (210) booths may be performed using a builder interface accessible on the builder device (106). To aid in setup and execution of a configured event, the system (10) may also provide an exhibitor interface (214) to exhibitor devices (108) and provide an attendee interface (216) to attendee devices (110). Providing (214) the exhibitor interface may include providing interactive views of the hardscape and softscape to the exhibitor device (108), as well as providing additional information, features, and functionality intended for exhibitors or other personnel generally, or intended for specific exhibitors or other personnel individually. Providing (216) the attendee interface may include providing interactive views of the hardscape and the softscape to the attendee device (110), as well as providing additional information, features, and functionality to attendee users such as navigation or self-location.

An advantageous aspect of geolocating (202) venue hardscapes, which may provide a basis for configuring (208) an initial layout and assigning (210) booths as has been described, is that geolocation data associated with the hardscape may then be inherited by or otherwise related to the softscape. Geolocation (202) of venue hardscapes extends beyond location of basic features of a structure that contains an event space. For example, rather than only locating aspects of the structure that are apparent from satellite imagery or relevant to vehicle navigation (e.g., such as front doors, exterior walls, etc.), geolocation (202) of the hardscape includes developing an association between a plurality of geolocations (e.g., GPS coordinate) and a plurality of locations within the structure and event space.

As an example, a square ten thousand square foot event space may be represented in a hardscape and associated with ten thousand separate locations, each of one square foot in size. Such an association may be visualized as a matrix or other coordinate system where each distinct location may be identified based on its own location (e.g., location (0,0), location (0,1), location (0,2) . . . location (999, 999)). Geolocation of such a hardscape may be performed statically (e.g., values calculated and saved) or dynamically (e.g., by using a transformation function and one or more known geolocations) in order to create a relationship between each hardscape location and geolocation data. As an example, this may include assigning a first geolocation data to a first hardscape location, a second geolocation data to a second hardscape location, and so on. In this manner, any distinctly identifiable location within the hardscape may be geolocated, whether it is an open area of event floor space, a location of a restroom, or a location of a fire exit. One or more hardscape locations may share geolocation data depending upon the level of precision available to the geolocation data (e.g., locations (0,1) through (0, 5) may each be associated with the same GPS coordinate).

The relationship between location data and the venue hardscape may also be extended into, inherited by, or otherwise related with the venue softscape that is configured (208) and managed (210) for each configured (206) event. Where the venue softscape is maintained using a coordinate system that may be related to that of the venue hardscape, any associated geolocation data may be passed onto the venue softscape. For example, a twenty foot wide by twenty foot deep booth may be configured for the venue softscape as having corners at four locations that correspond to the venue hardscape (e.g., location (0, 0), location (0, 19), location (19, 19), location (19, 0)). With such correspondence to geolocated venue hardscape locations, geolocation may be imparted onto various aspects of the booth (e.g., geolocation data may be determined for each corner of the booth, for portions of the booth, or for a generally central point of the booth).

Whether maintained as separate coordinate systems or available from sets of transformation functions, the ability to interrelate location data, venue hardscape locations and/or objects, and venue softscape locations and/or objects provides a number of advantages. In particular, due to the nature of venue management and event space management, a system configured as described is capable of maintaining and interrelating datasets that rarely or never change (e.g., geolocation data, venue hardscapes) with datasets that may change on a day-to-day or week-to-week basis. For example, a particular event space may host a comic book exhibit during a weekend, transition to a professional seminar during the following week, and then transition to an automotive exhibit during the immediately following weekend. Each event may have a drastically different set of softscape data indicating the locations and sizes of booths. However, by providing static or dynamic correlation to the softscape, geolocation data for softscapes may be determined as needed, which may include manually requesting or viewing data for a particular event, or may include automatically providing a set of "current" softscape data based upon the current date and any events that are configured (206) for that date. Softscape geolocation using any of the features or methods described herein provides additional opportunities for gathering data, managing events, and assisting event attendees and exhibitors.

Figure 3:
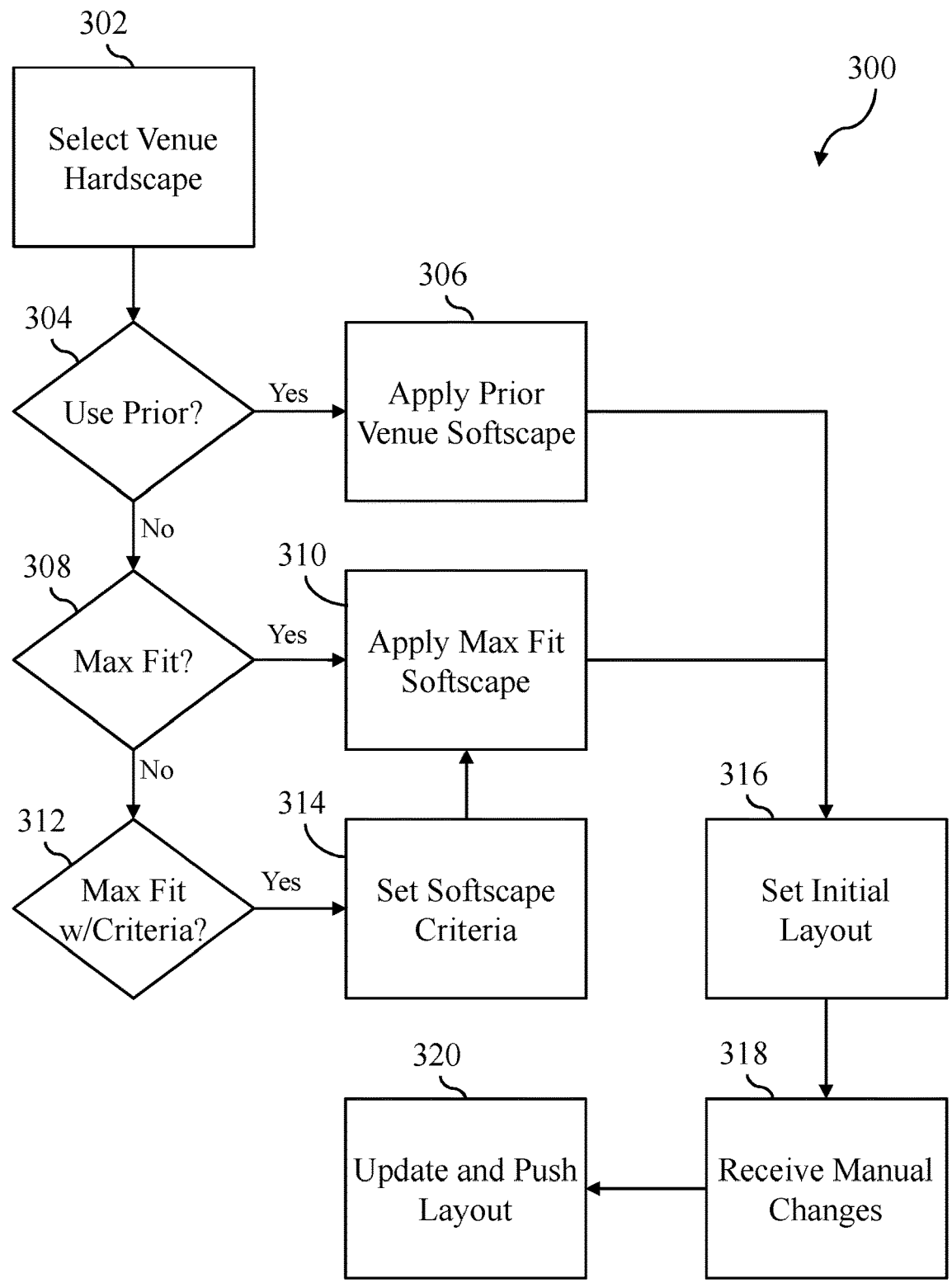
FIG. 3 is a flowchart of an exemplary set of steps that a system could perform to initially configure an event space.

While FIG. 2 describes several features and functions of the system (10) at a high level, additional examples and features are described below in FIGS. 3-9. For example, FIG. 3 shows a flowchart of an exemplary set of steps (300) that a system could perform to initially configure an event space layout. When a user selects (302) a venue to be associated with a particular event, a hardscape for that venue is selected from the venue library (104). In some implementations, hardscapes may be associated in the venue library (104) with partial or complete softscape features that may be used when producing an initial or default layout. As will be apparent, some implementations may also allow a user to disable or disregard such softscape features and provide an initial layout with no softscape features.

When softscape features are associated with a hardscape and included in the initial layout, they may be configured in various ways. As an example, in some implementations a prior venue softscape may be available (304) and may be applied (306) to the hardscape to produce an initial layout. As an example, the prior softscape may be a softscape previously used for that event (e.g., for an event that is held at the venue annually, a prior year) or previously used for that venue (e.g., the softscape most recently used for the venue, a softscape used for a similar event).

There may also be a max-fit softscape (308) associated with the hardscape. As has been described, the max-fit softscape may include booths of a standard size (e.g., square booths of 100 square feet) maximally distributed across the hardscape while still meeting requirements relating to walkways size, fire safety, or other needs. Where a max-fit softscape is present (308), the max-fit softscape may be applied (310) to the hardscape and used as the initial layout.

Some implementations may support a dynamic max-fit softscape that also meets certain configured criteria (312). For example, where a max-fit softscape is generally acceptable as an initial layout but would require some immediate modification criteria may be defined (e.g., by a user of the builder device (106) or administrator of the system (10)) to produce a partial max-fit layout. This could include criteria requiring a certain number of booths of varying sizes or shapes beyond the max-fit default booth, criteria showing a preference for placing larger booths towards the middle of the venue or towards the static walls, criteria for including booths having a size and location for which particular exhibitors prefer (e.g., the system may determine that Exhibitor A has requested a booth having the same size, shape, and position several years in a row in a particular venue or across several venues within the venue library (104), or the system may determine that Exhibitor B has submitted an electronic message or form showing interest in a booth of particular characteristics for an upcoming event, and may ensure that the max-fit includes the same or similar style of booth), criteria for specifying a non-standard walkway size (e.g., such as where a larger walkway size than typically used for max-fit may be desirable), or criteria to randomize or filter specific booth features (e.g., partially or completely prevent booths from sharing walls, randomly introduce booths of varying sizes and shapes within limits).

Where a max-fit with additional criteria is desired (312), the softscape criteria may first be selected (e.g., by user input) or determined (e.g., based upon a pre-existing configuration) and set (314), and then a dynamic max-fit softscape that meets the set criteria (314) may be created and applied (310) to the hardscape. After an initial softscape has been applied to the hardscape, the system (10) may set (316) the initial layout produced by the combination of the selected (302) hardscape and applied (306, 310) softscape. Once set (316), the initial layout may be viewed and interacted with via the builder interface and/or builder device (106). If any immediate changes are needed before the initial layout becomes generally available (e.g., for assigning booths (210)) the user generating the layout may provide manual changes (318). This may include introducing or modifying booths, deleting booths to create open areas, locking booths to prevent later modification to their size or shape, locking booths to prevent later assignment by other users, or other similar changes.

Received (318) manual changes may be applied to update the initial layout, which may then be pushed (320) as the universal initial layout for the event. As has been described, some implementations of the system (10) include conflict prevention features to ensure that modifications and assignments of booths by multiple users in parallel do not result in conflicts such as double booking. Such features may be implemented by maintaining "universal" versions of data associated with the hardscape and softscape for the event and venue and synchronizing the universal data between clients as changes are made, such that each client, when actively working with the system (10), is always working on an accurate layout. Implementations of such features will be described in more detail below, and may also be referenced herein when discussing "pushing" data, which may include pro-actively pushing data between clients and the management server (100) (e.g., instead of or in addition to "pulling" or "requesting" data) in certain situations to provide accurate data and state management of clients in near real-time.

Figure 4:
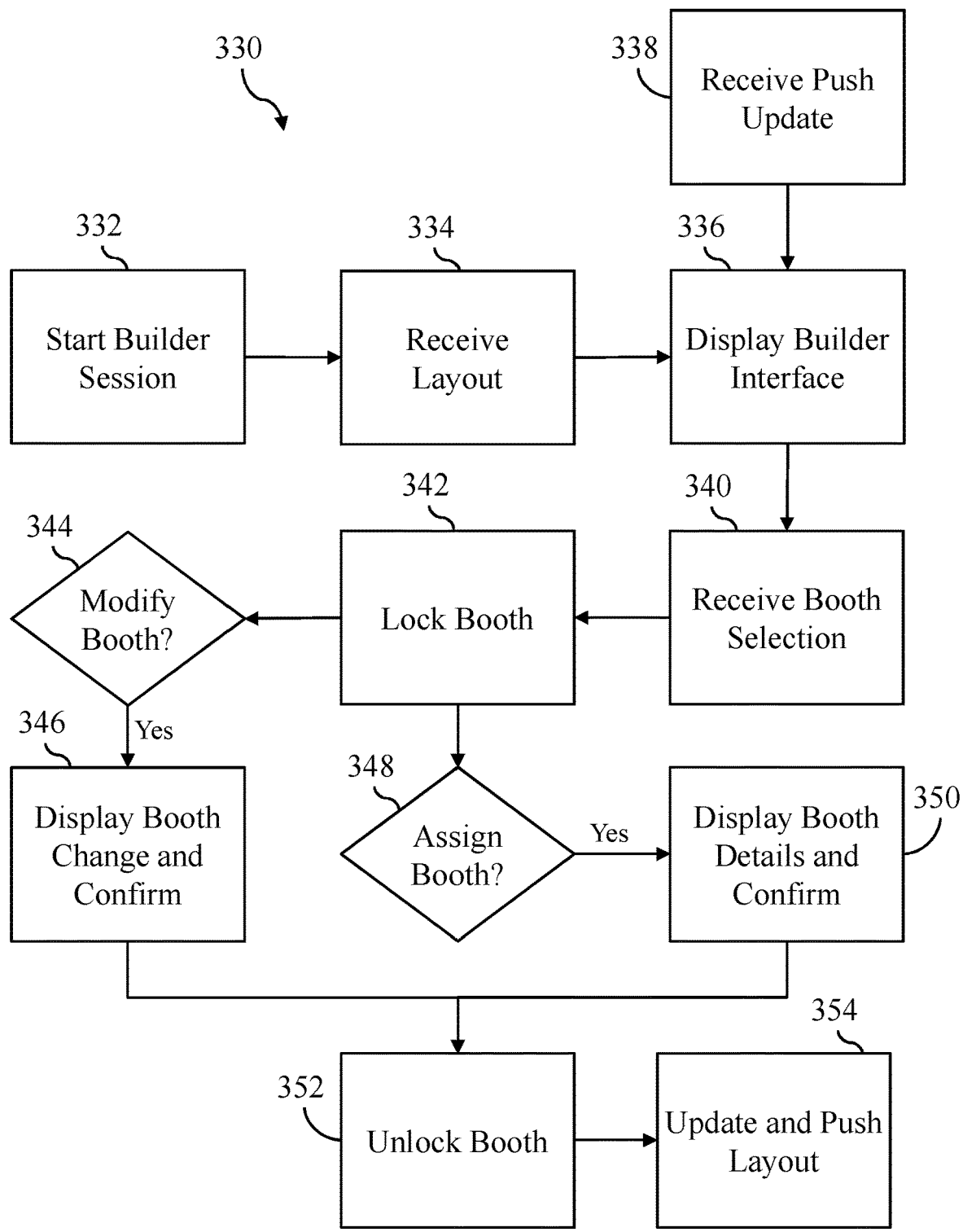
FIG. 4 is a flowchart of an exemplary set of steps that a system could perform to modify and assign booths in an event space.

FIG. 4 is a flowchart of an exemplary set of steps (330) that a system could perform to modify and assign booths in a layout based on input provided from one or more users. When a user accesses the management server (100) via the builder device (106) a builder session may be started (332) for that device. During a builder session, the management server (100) may attempt to maintain communication with the builder device (106) (e.g., by regular pinging or other transmission of data, by establishing a synchronous communication channel) and also maintain a record of the state of the builder device (106), including information such as the device's IP address or other identifying information, inputs received from the device, output provided to the device, and whether or not the device is actively in communication with the management server (100).

Figure 11:
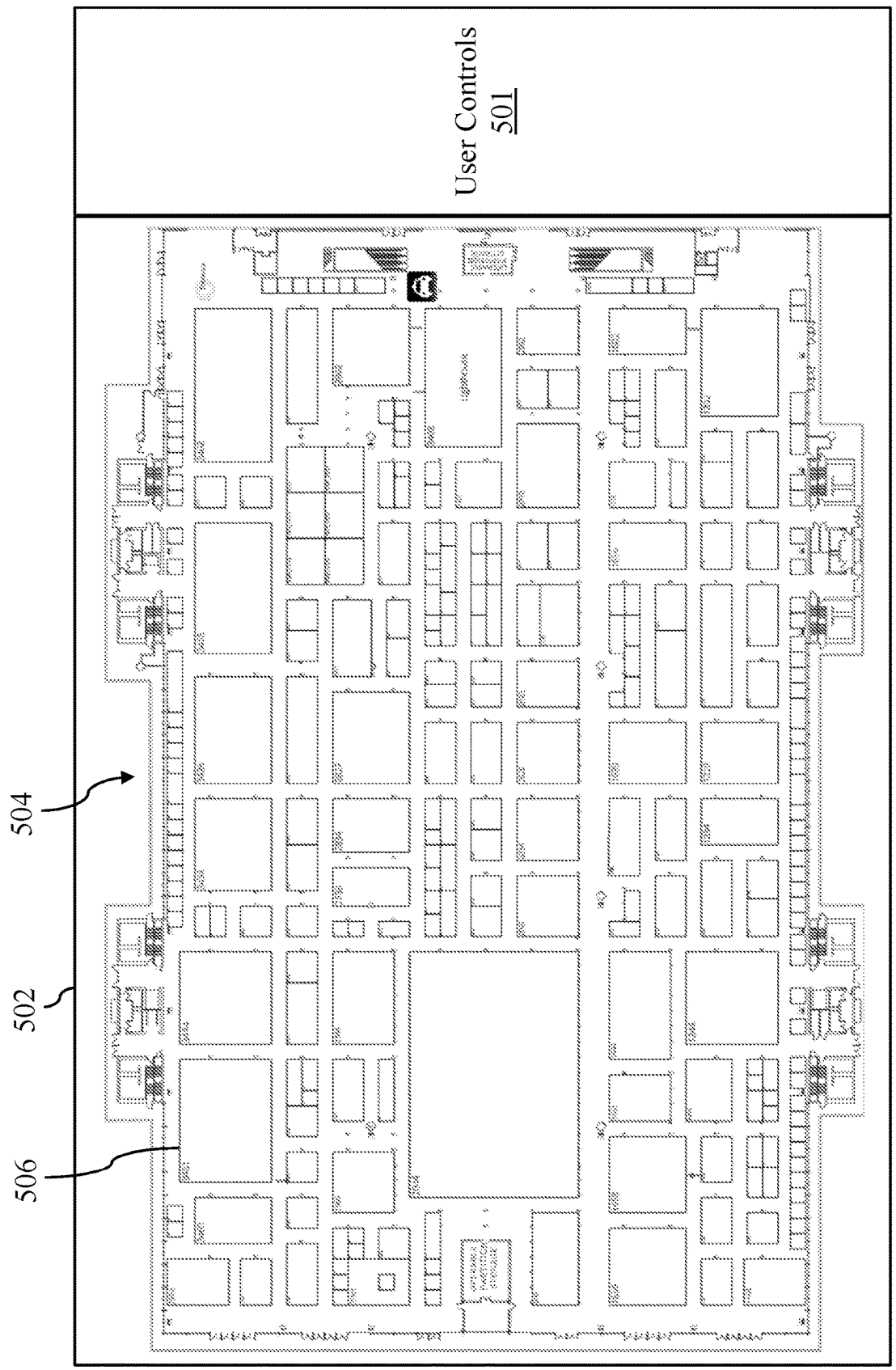
FIG. 11 is a schematic diagram illustrating an exemplary user interface showing a venue at a first view.

During the builder session (332), the client device may receive (334) a set of layout information and use such information to display (336) a builder interface via a display of the client device. In varying implementations this may include receiving and displaying data through a web browser interface, receiving and displaying data through a communications channel established by another software application, or both. When displayed (336), the builder interface may display the layout, and may also provide various additional data and user controls to allow the user to interact with the layout. As an example, FIG. 11 shows an exemplary interface that may be displayed during a builder session, including a layout viewer (502) that displays a layout of a venue (504), including various softscape features such as a booth (506). A set of user controls (501) may also be displayed and interacted with.

Figure 12:
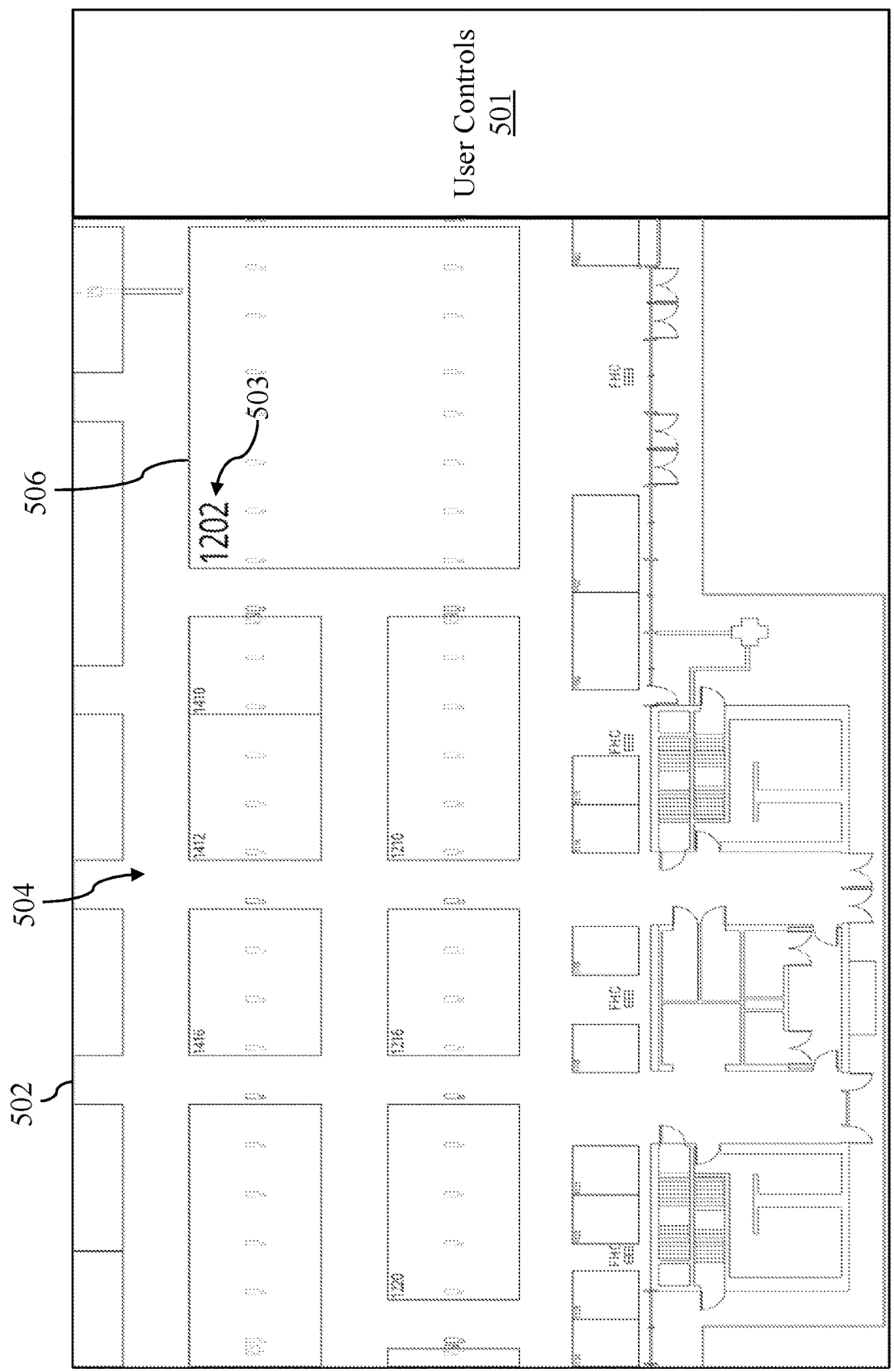
FIG. 12 is a schematic diagram illustrating an exemplary user interface showing a venue at a second view.
Figure 13:
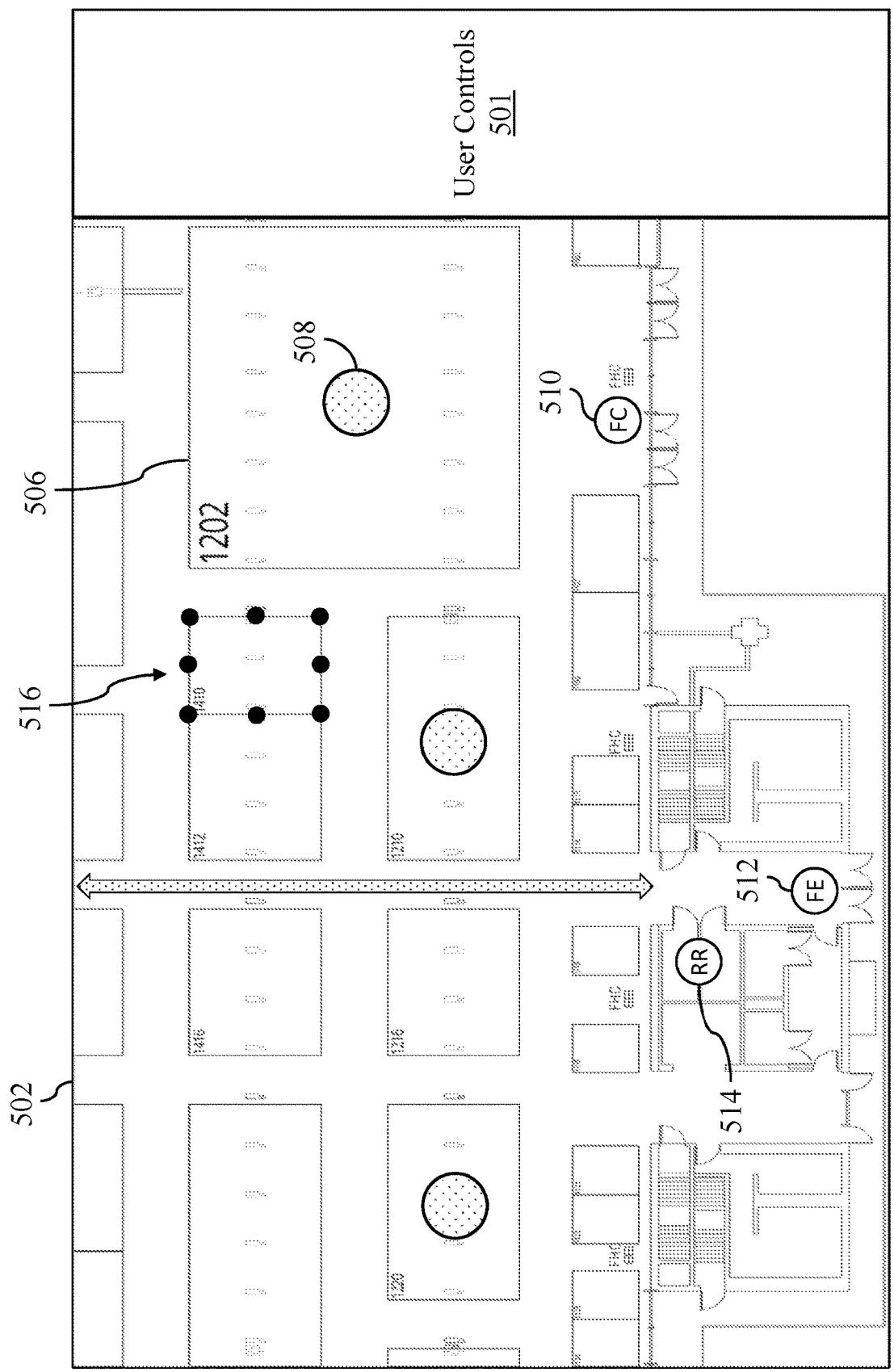
FIG. 13 is a schematic diagram illustrating an exemplary user interface showing the second view with additional markings.

It should be understood that the particular controls included in the set of user controls (501) may vary by implementation. Examples of user controls include panning and zooming the display of the layout in the layout viewer (502), as can be seen in FIG. 12 which shows a magnified portion of the venue (504). The user controls may also include controls for locking and unlocking booths, in order to prevent other users from modifying the booth for a period of time. As an example, FIG. 13 shows a lock indicator (508) associated with a booth (506), which visually indicates to users that the booth has been locked by a user and may not be interacted with. The lock indicator (508) may be displayed as one or more visual characteristics, such as a pattern or shading of the booth (506), an icon or symbol of a padlock, a color, or other visual characteristic. The user controls may also include controls for viewing, searching, and modifying booth identifiers (503). The user controls may also include controls for viewing, searching, and modifying exhibitors that have been or are requesting to be assigned to a booth.

The user controls may also include controls for viewing and modifying the dimensions of booths, this may include displaying and allowing the modification of the width and depth of the booth, and displaying a calculation of the overall square footage of the booth. The user controls may also include controls for some or all of moving, deleting, copying (e.g., placing a copy of a booth elsewhere on the layout), splitting (e.g., dividing a booth into two sub-booths), and rotating booths on the layout. The user controls may also include controls for editing the shape of booths by selecting from a list of standard shapes (e.g., square, circular, chamfered, L-shaped, T-shaped, U-shaped, and other commonly used booth shapes as may be statically provided or dynamically configured by a user) or by selecting and moving one or more vertices of a booth achieve a desired shape. As an example, with reference to FIG. 13, a booth is shown with a set of vertices (516) displayed which may be interacted with by a user (e.g., by clicking on a vertex and then clicking on a new location, or by clicking and dragging a vertex).

The user controls may also include controls for selecting one or more booths and setting them to their original state (e.g., based on the initial layout) or setting them to a max-fit state (e.g., a large booth may be converted to two or more smaller booths according to a max-fit scheme). The user controls may also include controls for viewing and modifying pricing associated with booths. Booth pricing may be automatically calculated based upon various factors such as dimensions, overall square footage, booth height, booth shape, specific booth needs (e.g., active ventilation, active water source), booth position in the venue (e.g., booths proximate to the entrance may be highly valued, while distant booths may have a reduced value), and other factors. Booth pricing may be overridden and may support various pricing levels (e.g., customer loyalty pricing, membership pricing), and may be used to automatically produce pricing lists for an entire venue, to produce invoices for exhibitors, or to produce other price related data, as will be apparent to those of ordinary skill in the art in light of this disclosure.

The user controls may also include controls for adding icons or symbols to the layout that may display via the exhibitor interface, attendee interface, or both, and may indicate various aspects of the venue. This may include icons indicating a direction in which walkways should be used, nearby transit options (e.g., taxi or rideshare pickup points), phone charging stations, refreshment areas, elevators, restrooms, first aid stations, fire exits, primary entrances and exits from the venue, and other information. Exhibitor specific symbols may include marking of doors, stairs, or loading docks that can be used for delivery and transport of booth equipment and structures, for example. Attendee specific symbols may include markings identifying help desks or locations of venue guides, for example.

Such symbols may also be automatically added during creation of the initial layout based upon information parsed from a hardscape. As an example, with reference to FIG. 13, a fire cabinet symbol (510) is displayed near a location where the hardscape indicates a fire hose cabinet exists. As another example, a fire exit symbol (512) is displayed near a location where the hardscape indicates a fire exit exists, or where a user has manually designated a set of doors to be reserved as a fire exit. As another example, a restroom symbol (514) is displayed near a location where the hardscape indicates one or more restrooms exist. A restroom symbol (514) may also be manually placed where temporary facilities have been added for a particular event. Other symbols that may be parsed from a hardscape or manually added to a softscape exist, and such variations will be apparent to one of ordinary skill in the art in light of this disclosure.

The user controls may also include controls for adding outlines to the layout which may mark or designate areas for a specific purpose without being associated with particular booths. For example, where one section of a layout may be reserved for tobacco products or other age regulated items, an outline may indicate and textually describe that a photo ID is required to enter connecting aisles.

The user controls may also include controls for enabling and disabling various hardscape and/or softscape features or layers. This may include hiding the display of booths, hiding the display of text, hiding the display of features specific to fire, electric, or plumbing features, and other layers. The user controls may also include controls for switching between different venues, different floors of a venue, or different buildings that are grouped together as a venue (e.g., such as where two or more buildings are proximally situated and may host different portions of a single event). Switching between floors, venues, or buildings will result in the layout viewer (502) refreshing and displaying the selected layout.

The user controls may also include controls for defining paths or other areas within the layout that should be reserved and not filled with booths. Such required pathways or areas may also be automatically set when the initial layout is generated based upon information parsed from the hardscape (e.g., adding a path in which booths may not be placed as required by fire or safety code, or adding areas near fire hoses, fire exits, first aid kits, automatic defibrillators, or other features so that they are not blocked obscured by a booth). The user controls may also include controls for searching for booths or exhibitors based upon a booth number, exhibitor name, exhibitor category, or exhibitor type, for example. Other examples of user controls exist, as will be apparent to those of ordinary skill in the art in light of this disclosure.

With reference to FIG. 4, after displaying (336) the builder interface a user may interact with the user controls (501) as described above. Some user interactions with the builder interface, especially those that may result in a change to the layout (e.g., addition, deletion, or modification of booth size, shape, location, change of booth characteristics or assignment status, addition of symbols, paths, outlines, or other features) have a risk of introducing error or conflict when multiple users are working on the layout in parallel. For example, absent any conflict prevent features, one user may be in the act of assigning a particular booth to an exhibitor that has agreed to reserve it, and a second user may delete the booth in order to increase the dimensions of a nearby booth upon the request of a second exhibitor. In each case, there is a risk that the requested reservation becomes unavailable or impossible to provide while it is already in progress, which may cause frustration with layout coordinators and exhibitors.

The system (10) may implement a number of features to mitigate or eliminate such risks. Several such features have been previously mentioned, such as maintenance of a universal layout across clients through pro-active pushing of data and maintenance of ongoing communication and client state for clients when starting (332) a builder session.

As an example of another conflict prevention feature, it may be especially advantageous to prevent conflicts around booth changes and booth assignments. To aid in this, when a booth selection is received (340) from a client (e.g., when a user clicks on a booth), the booth may be immediately locked (342) by the management server (100). Locking (342) the booth may include updating the universal layout to indicate that the booth is locked (e.g., by adding an icon or other visual characteristic to the booth such as the lock indicator (508)) and then pushing the updated universal layout to each client for which a builder session has been started (block 332). Whenever a client receives (338) a push update, the builder interface is immediately updated and redisplayed (336) to reflect the change. To further mitigate such risks in the above scenario, the client side software of the builder device (106) may be configured to, on receiving input from a user indicating a booth selection, first verify the state of the universal layout with the management server (100) before providing the selection to be received (340) by the management server (100). By pushing the universal layout to clients, configuring clients to request the universal layout prior to selections, or both, the risks of simultaneous or conflicting booth selections may be substantially eliminated.

The locked booth (342) will remain locked until the locking user deselects it so that it can be released to other users, typically when the user is done modifying the booth (e.g., assigning an exhibitor, changing the booth size or other characteristics). A user that has selected a booth may also manually lock the booth, such that it remains locked even when deselected, as has been described. While a booth is selected and locked, a user may perform various actions such as modifying (344) the booth characteristics or assigning (348) the booth to an exhibitor.

When modifying (344) the booth, the user may interact with the user controls (501) as has been described. Booth changes may be displayed to the user locally before they are confirmed and committed to the universal layout (346). Once confirmed locally (346), the booth changes may be provided to the management server (100) so that the booth may be unlocked (352) and the universal layout may be updated and pushed (354) to all active clients. From the viewpoint of an active client, when a push update is received (338) there may be no action or control on their part, and there may be no obvious change (e.g., such as a loading screen or a window refresh indicator) to indicate that a booth has been unlocked (352) and updated (354) beyond the individual visual changes (e.g., removal of the lock indicator (508), change in the displayed size or shape of the booth).

When assigning (348) the booth, the user may interact with the user controls (501) as has been described in order to provide exhibitor details and associate an exhibitor with the booth. Booth assignments may be displayed and confirmed (350) locally before being committed to the universal layout. Once confirmed (350) locally, the booth assignment may be provided to the management server (100) so that the booth may be unlocked (352) and the universal layout may be updated and pushed (354) to all active clients.

Figure 5:
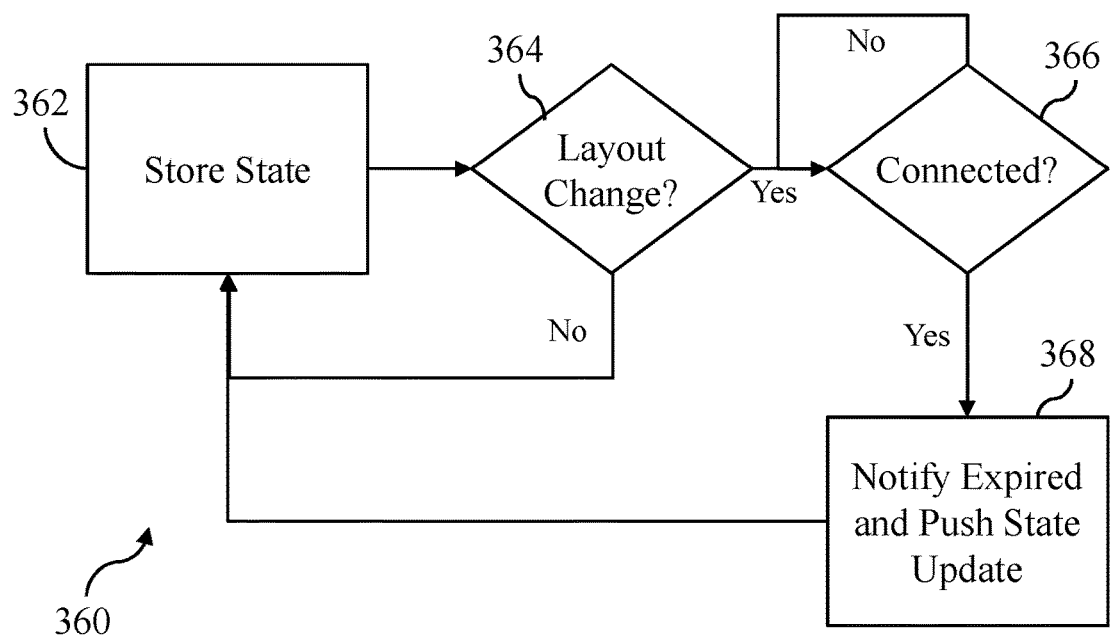
FIG. 5 is a flowchart of an exemplary set of steps that a system could perform to manage state across a plurality of user devices.

FIG. 5 shows an additional conflict prevent feature that may be implemented to manage state and connectivity for a plurality of user devices, individually or in combination with other conflict prevention features described herein. The management server (100) may be configured to store a session state (362) for each builder device (106) that has an active builder session. Storing state (362) may include determining the most recently known state of the client device's builder interface (e.g., whether a booth was selected), the most recent time that the device was communicated with (e.g., the most recent universal layout push or other successful data transfer), and whether the device has subsequently been determined as offline (e.g., due to lack of internet connectivity or because the user intentionally closed the builder interface), for example.

Whenever a change to the universal layout is received and committed (364) by the management server (100), each device for which the state is currently stored (362) will be queried to determine whether or not they are still connected (366) to the session and the management server (100). For each device that is connected (366), the management server (100) may notify the client of a change in the universal layout to indicate that their current local session is expired (368) (e.g., this may include an invisible change in the builder interface state, such as setting a flag to indicate that an update is pending and that any local layout changes should be held until complete) and may push an updated state to the client (e.g., an updated universal layout, an updated version of the stored state (362) associated with that client). Upon receipt, each client will adopt the updated state and universal layout as has been described (e.g., receiving (338) a push update as described in the context of FIG. 3).

Where the management server (100) determines that a client device is not connected (366) but may be participating in a still active builder session (e.g., such as where the builder interface is temporarily operating wholly based on data locally available to the client), the management server (100) will regularly attempt to reestablish communication with the client until either a connection (366) is successful or a duration of time without communication has passed such that the management server (100) is configured to discard the stored client state and require a new builder session be created in the event of subsequent communication. By storing device state as described, the management server (100) may treat each builder device (106) as being online for the purposes of distributing updates to the universal layout and other state changes that may impact client devices, even where such client devices are truly offline or where the session has been ended locally by the client. When an offline client reconnects, the universal layout and state changes may be seamlessly and immediately provided, or may eventually be discarded once a configured session timeout is exceeded.

Figure 6:
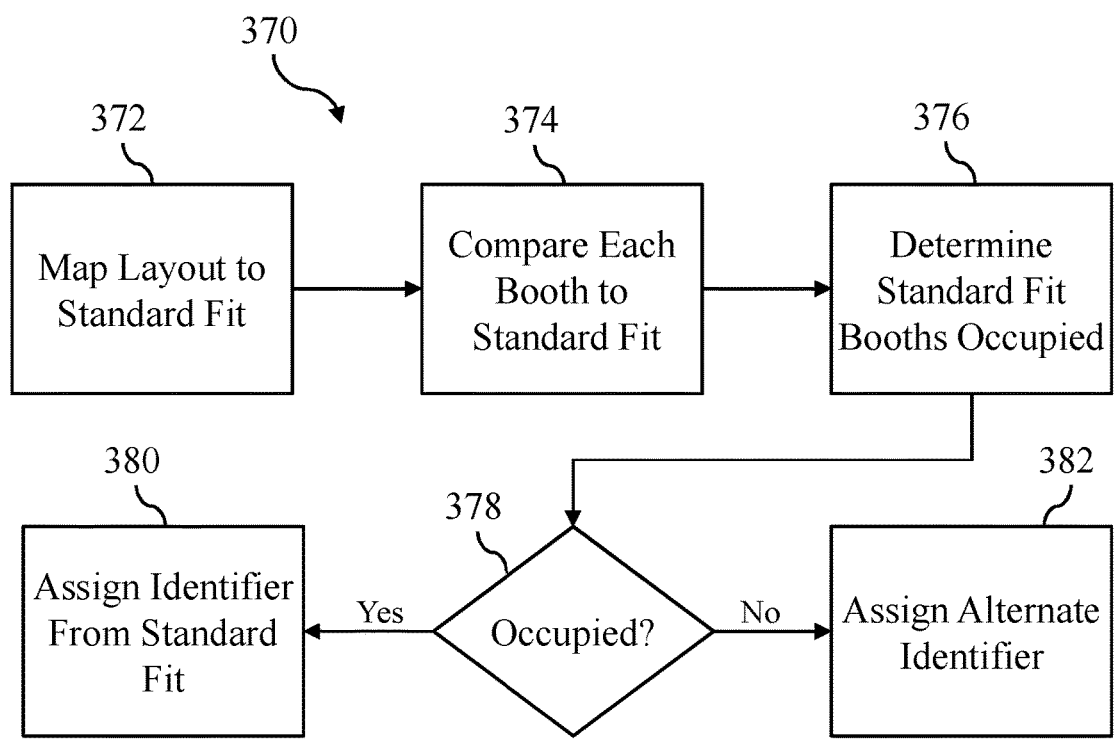
FIG. 6 is a flowchart of an exemplary set of steps that a system could perform to manage booth numbering.

FIG. 6 is a flowchart of an exemplary set of steps (370) that a system could perform to automatically assign identifiers to booths. With reference to FIG. 12, it can be seen that the booth (506) includes a booth identifier (503). Each booth shown on the layout may be assigned an identifier such as a number or text string that may be used to search for and identify booths, and to communicate information related to booths to exhibitors, attendees, or others. Manually assigning booth identifiers may be time consuming and may also lead to accidental assignment of duplicate identifiers to more than one booth. It may be advantageous to provide a builder interface that automatically assigns non-arbitrary identifiers based on a preconfigured identifier scheme, while also enforcing de-duplication.

When assigning booth numbers using a preconfigured identifier scheme, the system (10) may at least partially preserve the preconfigured scheme, as well as the preconfigured scheme's relationship to the spatial layout of the venue. By associating specific areas within the event space with an identifier, a booth constructed in that area may also be associated with that identifier. This can be useful where, for example, contractors are assembling booth structures prior to an event within an event space that is mostly empty. The location with the event space where a particular booth should be constructed may be referred to by the identifier both prior to and after construction of the booth. By providing location specific, non-arbitrary identifiers, contractors, venue staff, and others may use the identifier to find the booth space prior to and after construction.

To provide an example, the system (10) may assign sequential numbers to each space within the venue that may potentially be used for a booth. This may include assigning sequential numbers corresponding to the max-fit booth layout, as previously discussed. In such an example, each max-fit booth (e.g., a square booth of 100 square feet) may be assigned a number in sequence, starting from an origin point within the venue. Assigned numbers may be truly sequential, or may be assigned based on lanes or crossroads (e.g., a first block of booths may be 1000 through 1250, while a second block of booths separated from the first may be 2000 through 2250), or may be assigned using other positional numbering schemes. In this manner, a person familiar with the numbering scheme may be able to generally identify the area in which booth 1234 is located or may be able to identify the exact location of the booth based on the identifier.

However, a user's ability to modify the initial layout in order to create or delete booths, or to convert several mall booths into a large booth will generally result in layouts that do not match the default scenario (e.g., such as a layout that has been modified such that it is no longer max-fit). In this scenario, a sequential numbering of booths will not preserve the locational correspondence between booth numbers and positions within the venue, since two or more booths may be combined into a single booth, and so booth 1234 may no longer exist, or may be positioned at various locations within the venue depending on the number of booths that have been deleted, added, or resized.

Some implementations of the system (10) may provide automatic booth numbering while also preventing identifier conflicts and preserving locational correspondence. In such implementations, the initial layout may be mapped (372) to a preconfigured standard fit identifier scheme (e.g., such as max-fit), even where the initial layout does not match the standard fit identifier scheme. Once mapped (372), each existing booth in the layout may be compared (374) to the standard fit layer in order to determine (376) and identify each standard fit booth that is occupied by the existing booth (e.g., where occupation may be determined as the configured booth occupying more than 50% of the standard fit booth area). As an example, where an existing booth is a square booth of 100 square feet, and is placed such that it completely or mostly covers a similar standard fit booth having identifier 1234, the existing booth is determined to occupy standard fit booth 1234. Where an existing booth has been created to be 300 square feet (e.g., 30 feet wide and 10 feet deep) and is placed such that it completely or most covers standard fit booths 1234, 1235, and 1236, the existing booth is determined to occupy those standard fit booths.

Where it is determined (376) that an existing booth on the layout occupies (378) one or more booths, an identifier from an occupied standard fit booth may be assigned (380) to and associated with the existing booth. The identifier may be chosen from the set of occupied standard fit booths in varying ways, such as the lowest numbered identifier, the highest numbered identifier, or a centrally located number. Following the above example, where existing booths are automatically assigned the lowest numbered identifier from the occupied standard fit booths, the 300 square foot booth would be assigned identifier 1234. Sequential identifiers prior to and after the example booth are not impacted by the change in the size and number of booths, and if booth 1234 is later deleted no changes or renumbering is required elsewhere in the sequence. In this manner, identifiers may be automatically assigned to booths even as they are created, resized, and reshaped, and numbers that are assigned to booths are immutable once assigned so long as that booth is not itself deleted, resized, or reshaped. The locational correspondence is also preserved, as booth 1234 occupies standard fit booth 1234, rather than being shifted elsewhere within the venue relative to the standard fit layer.

In situations where a booth created on the layout does not occupy (378) any standard fit booths, such as where a square booth of 100 square feet is divided in half, or a new booth is created that straddles but does not occupy several standard fit booths, an alternate identifier may be assigned (382). The alternate identifier may be a temporarily assigned numerical or text identifier, or may use an alternate or modified identifier scheme. As an example, where standard fit booth 1234 is divided into two equal sub booths, the sub booths may be automatically numbered as 1234.1 and 1234.2.

Figure 15:
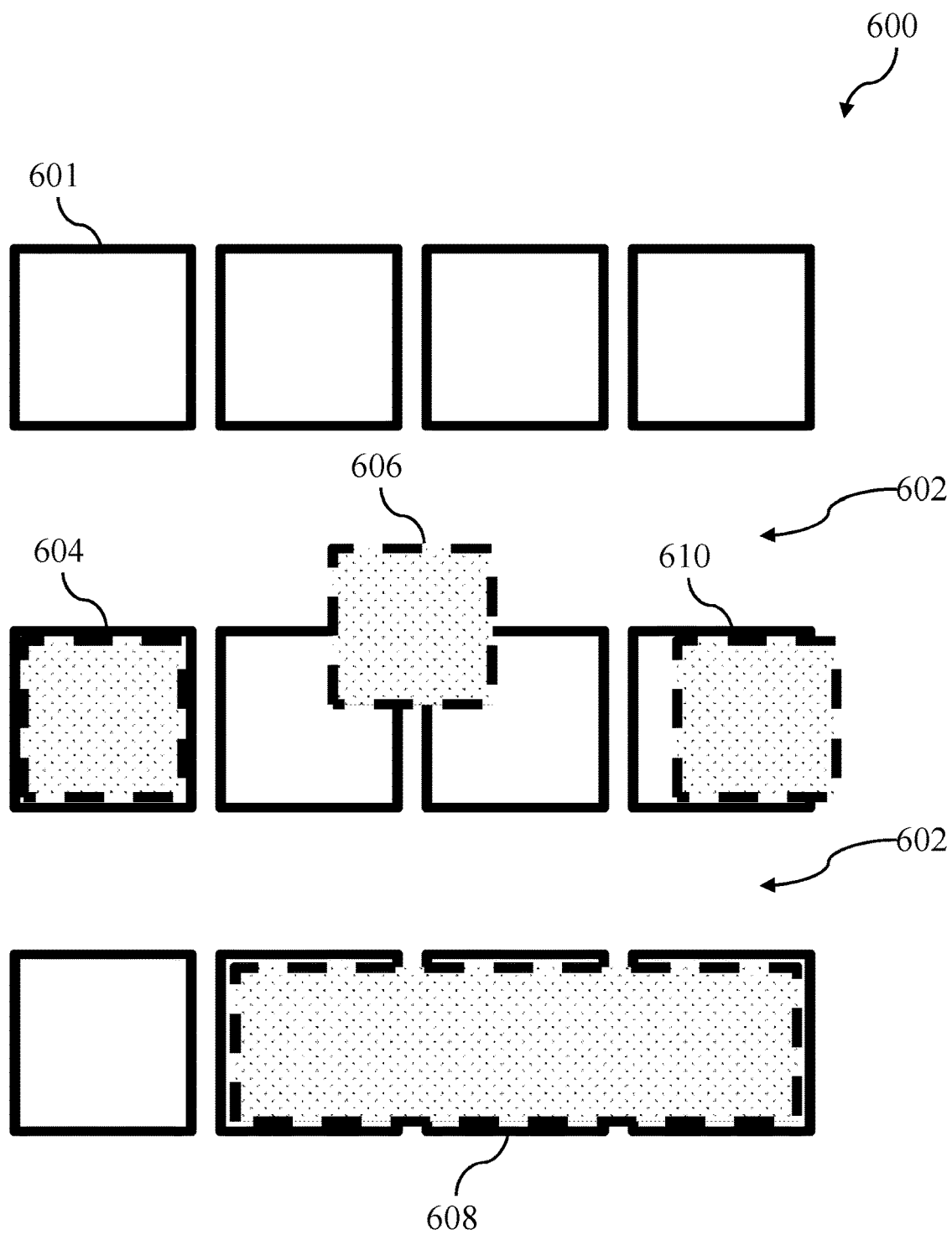
FIG. 15 is a schematic diagram illustrating the relationship between dynamic and static booth positions.

FIG. 15 provides visual examples of several of the above. A venue space (600) includes three rows of standard fit booths (601), illustrated as solid lined squares. Configured booths that have been added to the layout are illustrated as patterned dash lined squares. Each row of booths is separated by an aisle (602). In a first example (604), it can be seen that a configured booth entirely occupies a standard fit booth space, and so may be assigned the identifier associated with that standard fit booth space. In a second example (606), a configured booth has been added at a position that partially covers two standard fit booths, but does not occupy any standard fit booth space, and so may be assigned a temporary identifier or other alternative identifier. In a third example (610), a configured booth has been added such that it mostly covers a standard fit booth space such that it occupies the space, and so may be assigned the identifier associated with the occupied standard fit booth space. In a fourth example (608), a configured booth has been added at a position that completely occupies three standard fit booth spaces, and so may be assigned an identifier associated with one of the occupied booth spaces (e.g., the left-most, the center, the right-most).

Figure 7:
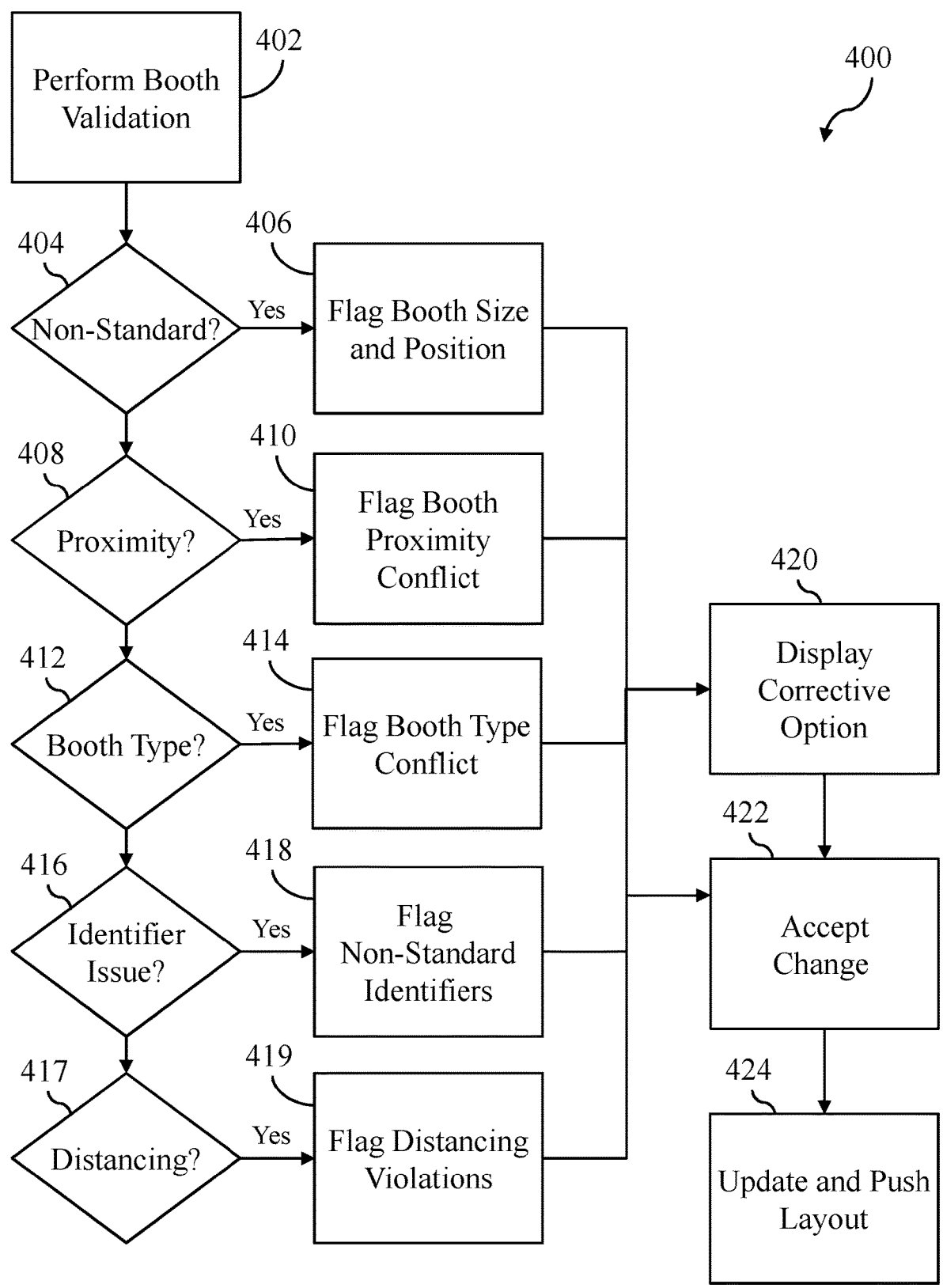
FIG. 7 is a flowchart of an exemplary set of steps that a system could perform to validate booth configurations.

FIG. 7 is a flowchart of an exemplary set of steps (400) that a system could perform to validate booth configurations for a particular layout. Booth validation may be performed (402) at varying times, such as when an initial layout is created, each time a layout is modified (e.g., booths are added, deleted, or modified), upon finalization of a layout, or at other scheduled or arbitrary times while a layout is being maintained. When booth validation is performed (402), the system (10) will analyze each booth on the layout, and may analyze other aspects of the layout (e.g., walkway size, safety equipment and fire exist accessibility, electrical outlet availability), in order to determine whether any actual or potential errors have been introduced to the layout during assignment (210) of booths.

As an example of a validation that may be performed (402), the system (10) may examine booths on the layout and flag any booths having non-standard characteristics (404). Characteristics that may be flagged as non-standard may include, for example, booths that are not aligned to the standard fit booth layer (e.g., such as where a standard fit booth is only partially occupied by one or more created booths), booths that have fractional square footage (e.g., such as booth that is 10 feet wide and 10.5 feet deep having a square footage of 105 feet), booths that have fractional edge dimensions (e.g., such as a booth that is 10 feet wide and 10.5 feet deep), or booths that have non-standard shapes (e.g., such as a custom shaped booth that is asymmetrical).

While not necessarily erroneous it may be desirable to avoid or address non-standard (404) booth characteristics if possible by flagging (406) the booth and indicating the potential issue via the builder device (106) and/or by displaying (420) one or more corrective options or changes that may be made to the affected booths, which may include moving, aligning, resizing, or reshaping booths to meet preconfigured standard characteristics. The corrective options may be displayed (420) and accepted (422) by a user or may be automatically accepted (422) by the system (10). Once accepted (422), the corrective changes may be updated to the universal layout and pushed (424) to client devices.

Another example of a validation check is a proximity (408) analysis of hardscape and softscape structures or features, relative to each other, to identify any spatial conflicts. This may include identifying booths whose walls contact or overlap another booth or a hardscape structure (e.g., such as a permanent wall of the venue), booths that are too close to neighboring booths (e.g., in some cases a gap of 12 inches or more may be desirable between adjacent booths), booths that impinge upon walkways, booths whose height is too close to a ceiling of venue, or booths having other spatial issues. Proximity conflicts (408) may also be flagged (410) and indicated as potential errors via the builder device (106) and may also have corrective options displayed (420) to be accepted (422) and applied (424) to the layout. While some proximity conflicts may only be potential errors, true proximity errors such as booths having overlapping walls may be flagged (410) differently than other proximity issues, and may also have corrective options (420) automatically accepted (422) and applied (424) without the permission or manual acceptance of a particular user.

Another example of a validation check is a booth type (412) analysis of softscape booths present in the layout to verify that any configured requirements of the booth are met by the position of the booth within the layout. As an example, some booths may have a configured type that indicates the structure and layout of the booth, and any requirements for constructing the booth. A booth such as an island booth may have as a requirement that it be surrounded by aisles on each side (e.g., no wall of an island booth may be shared with or adjacent to any other booth wall or hardscape wall). A peninsula booth type may require aisles on at least 3 sides (e.g., one wall of the peninsula booth may be adjacent to or shared with another booth or hardscape wall). A perimeter booth may have an aisle on only one side (e.g., other walls may be shared with or adjacent to other booth walls and/or hardscape walls). Booth types and particular booths may be configured with other requirements such as, for example, electrical outlet requirements, accessibility requirements, plumbing or exhaust requirements, or other examples. Booth type conflicts (412) may be flagged (414) and corrective options may be proposed (420), accepted (422), and applied (424) as has been previously described.

Another example of a validation check is an identifier issue. As discussed in the context of FIG. 6, management of booth identifiers can be advantageously performed using variations of the system (10) disclosed herein. Individually or in addition to such other features, the system (10) may check for identifier issues (416) and, where they exist, flag (418) any issues, and then display (420) corrective options that may be accepted (422) and applied (424). Identifier issues may include, for example, duplicate identifiers, unresolved temporarily assigned identifiers (e.g., such as where an automated process may assign a temporary identifier that should later be manually updated), or other identifier assignment issues that may be erroneous or may fall outside of a standard fit identifier scheme.

Another example of a validation check is a social distancing check that may be configured with a base set of social distancing goals which may be applied to each aspect of a layout. For example, a distancing goal might be defined in units of measurement (e.g., 4 feet, 6 feet, 8 feet) to describe the ideal distance that any exhibitor, attendee, or other person within the venue should be able maintain from another person. When validating the distancing goal, the system may check each hardscape feature relative to other hardscape features, each softscape feature relative to other softscape features, and each hardscape feature relative to each softscape feature (e.g., or the opposite). Since the each layer of the layout is related to each other, and to a configured scale, such validations are possible. As an example of a hardscape-to-hardscape validation, the system might search (417) for any pairs of hardscape features (e.g., doors, windows, toilets, water fountains, seating, telephones) that are within a distance that is less than the distancing goal, and flag (419) any pairs that violate the distancing goal. A list or map of flagged (419) pairs might then be used to make any needed changes, such as blocking off a single door, toilet, water fountain, or seating spot from each pair (e.g., where two water fountains are situated within a foot of each other, one water fountain may be taken out of service by tape, signage, or otherwise).

An example of a softscape-to-softscape validation, the system might search (417) for any pairs of softscape features (e.g., booths, walkways defined by booths, charging stations, other temporary features or resources) that are within a distance that is less than the distancing goal, and flag (419) any pairs that violate the distancing goal. Softscape distancing validation may also include, for each defined booth, determining a number of exhibitors that will be within the booth and verifying that the booth size allows for distancing of the exhibitor personnel, with any violations being flagged (419). A list or map of flagged (419) pairs might then be used to make needed changes, such as relocating, changing the size of, or changing the shape of a booth in order to allow for distancing within the booth, allow for distancing between adjacent booths, or allow for distancing in walkways defined by the booth.

An example of a hardscape-to-softscape validation (e.g., or the opposite), the system might search (417) for any pairs of softscape and hardscape features that are within the distancing goal, and flag (419) any pairs that violate the distancing goal. This search may be performed across different layers of the layout, using the correspondence created when setting (316) the initial layout. Validation may include verifying the area available within each booth, as may be impacted by a hardscape feature (e.g., a column or wall) allows for distancing for the number of exhibitors expected in the booth, as well as verifying defined walkways and other softscape features that might be similarly impacted by a hardscape feature (e.g., a column present in a walkway). Other examples might include verifying the distance between a hardscape feature, such as a door, and a softscape feature, such as a table or booth positioned near the door and used to accept tickets or check in. As with prior examples, flagged (419) pairs might be produced as a list or map that may be used to make any needed changes, whether changing the size of a booth, or moving a check-in table further away from an entry door, water fountain, or other hardscape feature.

As has been described, validations may be performed reactively to changes in the layout (e.g., each time a user modifies (344) or assigns (348) a booth, or makes other softscape modifications), based upon a schedule, when the layout is finalized, or at other times as will be apparent to those of ordinary skill in the art in light of this disclosure. Additionally, some displayed (420) corrective changes may be permissively proposed and accepted or may be automatically applied to the layout, depending upon factors such as the severity or nature of the flagged issue, as may be desirably configured with the system (10) in varying implementations.

Figure 8:
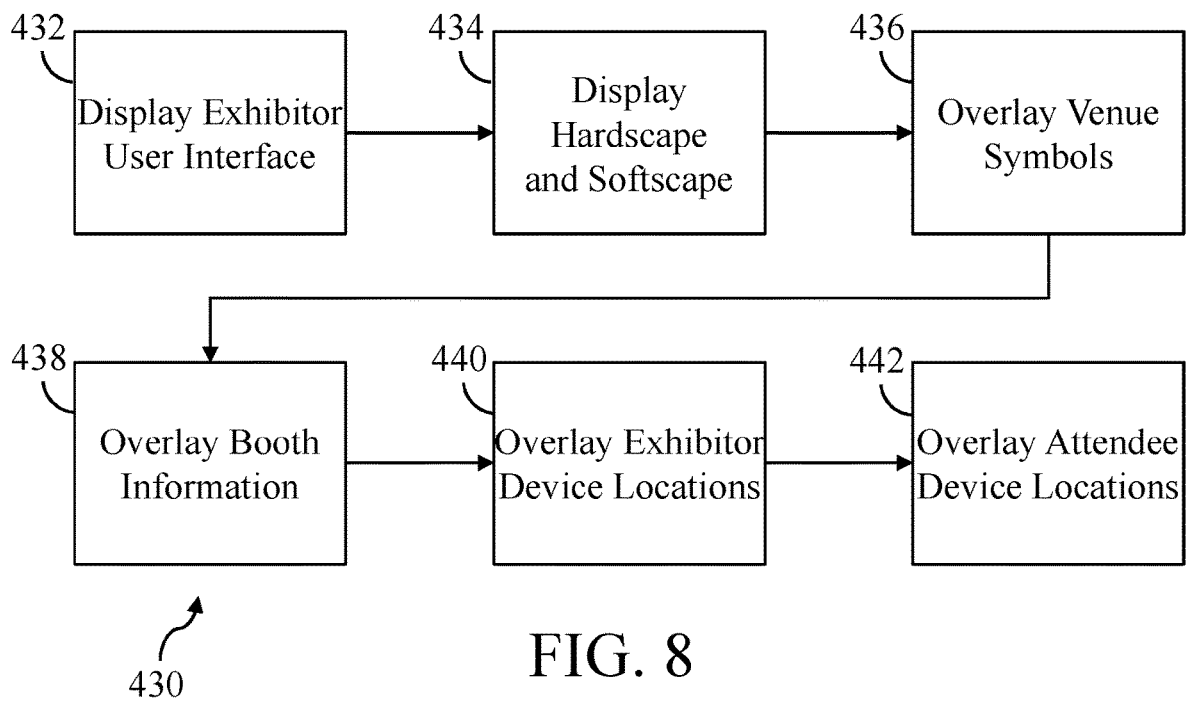
FIG. 8 is a flowchart of an exemplary set of steps that a system could perform to provide an exhibitor interface.

FIG. 8 is a flowchart of an exemplary set of steps (430) that a system could perform to provide an exhibitor interface. An exhibitor interface may be provided via the exhibitor device (108), for example, and may be intended to provide features and functionality useful to exhibitors, booth constructors, and other personnel as has been described. The exhibitor interface may be similar to the interface of FIG. 11, but the user controls (501) may lack some of the features of the builder interface such as the ability to modify the softscape and assign booths. When the exhibitor user interface is displayed (432), the layout softscape and hardscape may be displayed (434) via the layout viewer (502). Venue symbols may be overlaid (436) to provide general information (e.g., such as the restroom symbol (514)) or user specific information (e.g., such as highlighting or visually distinguishing one or more booths that are associated with the user as assigned booths (e.g., booths assigned to an exhibitor user, booths that a security guard user is responsible for patrolling).

Additional booth information may also be overlaid (438) to provide general information or more specific information based on a particular exhibitor user. General overlaid (438) information may include the name of a person or company booths are assigned to, a category of services or goods being exhibited at a booth, whether construction of the booth has been started or is complete, or other information. More specific information (438) provided to some users may include contact information for booth exhibitors (e.g., which may be useful to security guards but may not be generally available), notes or reports of any incidences that have occurred at booths such as shoplifting or vandalism, and other information that may desirable be provided to a subset of exhibitor users.

In some implementations, positions of exhibitor devices (108) may also be overlaid (440) on the layout viewer (502). Since exhibitor devices (108) are in communication with the management server (100) they may be configured to report locational information (e.g., GPS coordinates). When the venue hardscape has been geomapped or geolocated (202), locational information may be used to determine a specific location within the venue at which the device is located. Position information may be available between members of an exhibitor team (e.g., to aid in coordinating and executing event activities), to security guards or others in charge of the overall safety and use of the venue, to emergency personnel in the event of a fire or other emergency, and in other situations as may be desirably configured.

In some implementations, positions of attendee devices (110) may also be overlaid (442) on the layout viewer (502). While it is possible that not all attendees of a particular event will configure a device to function as the attendee device (110), information related to a subset of attendees may still be useful. Attendee information may be used to provide anonymous heatmaps showing crowd concentration within the venue, which may be useful for exhibitors and venue management. As another example, individual attendees may be identified and located by security personnel or emergency personnel when needed. Other uses and options for displaying information related to attendee device locations exist and will be apparent to those of ordinary skill in the art in light of this disclosure.

Figure 9:
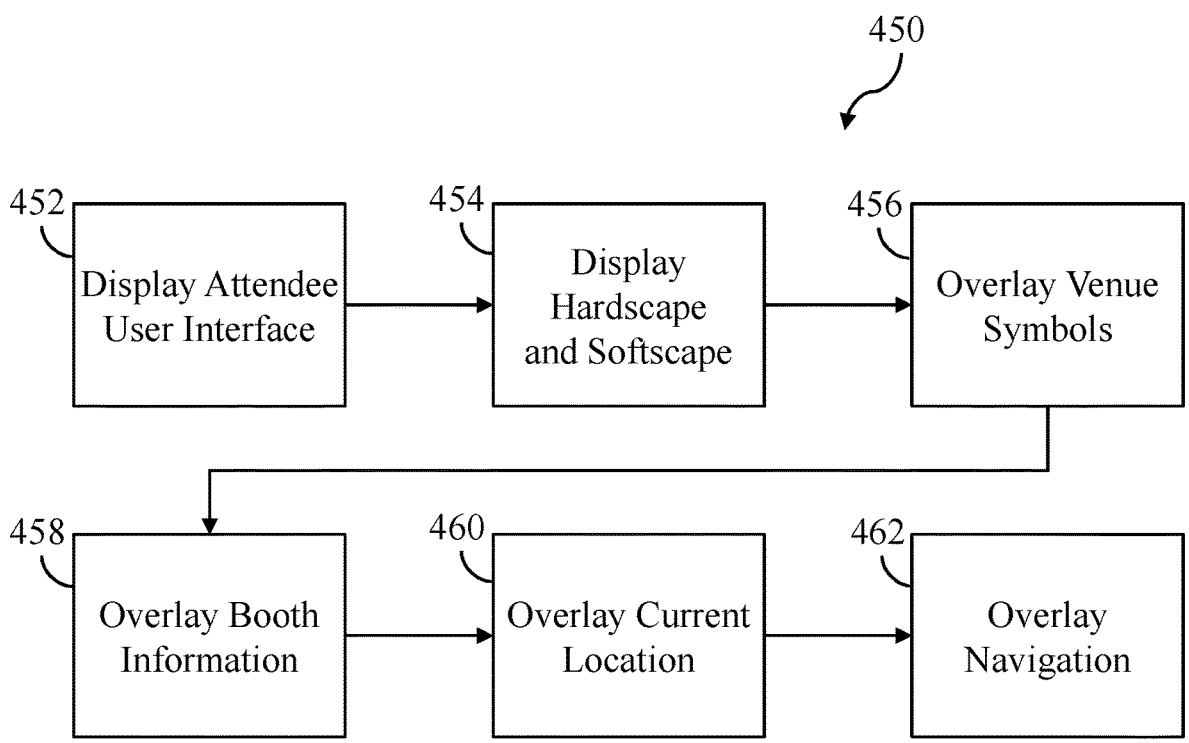
FIG. 9 is a flowchart of an exemplary set of steps that a system could perform to provide an attendee interface.

FIG. 9 is a flowchart of an exemplary set of steps (450) that a system could perform to provide an attendee interface. An attendee interface may provide attendees of an event additional features and functionality that may assist in reaching the venue, navigating within the venue, locating exhibitors of interest within the venue, and other desirable features. Configured attendee devices (110) may also provide valuable data analytics and additional options for safety and emergency response to the administrators of the venue or the management server (100). As with the exhibitor interface, when the attendee user interface (452) is displayed the attendee device (110) may display via the layout viewer (502) a hardscape and softscape (454), venue symbols (456), and booth information (458) as may be desirable configured. An attendee device's position (460) within the layout viewer (502) may also be displayed, by using location information provided by the device to position an indicator for the device within the geolocated hardscape.

In some implementations, tracking of user devices within the venue (e.g., such as for overlaying (440, 460) locations) may also be usable to provide contact tracing capabilities for events and venues, which may include generating a report for a particular user device that identifies other user devices within the venue that were within a configured distance of that user device, user devices that were proximate that user device for at least a configured period of time, user devices that were located within a particular area, or at a particular softscape or hardscape feature shortly after that user device, softscape features such as booths that the user device was located at, or hardscape features such as doors, restrooms, water fountains, or other hardscape features that the user device was located at. The system may also use information such as that included in a contact tracing report to provide automated notifications to user devices and other recipients that meet various criteria in relation to the particular tracked user device. For example, after generating such a report, the system may automatically provide text messages or application notifications to a plurality of user devices that were in the same locations at the same or similar times as the particular tracked user device. As another example, the system may automatically provide text messages, email notifications, applications notifications, or other electronic messaging to a plurality of vendors or exhibitors whose softscape areas (e.g., booths) were visited by the particular tracked user device. Such notifications may provide information or context on the reason for the notification, contact information, or other information such as might be usefully distributed for contract tracing purposes.

Figure 14:
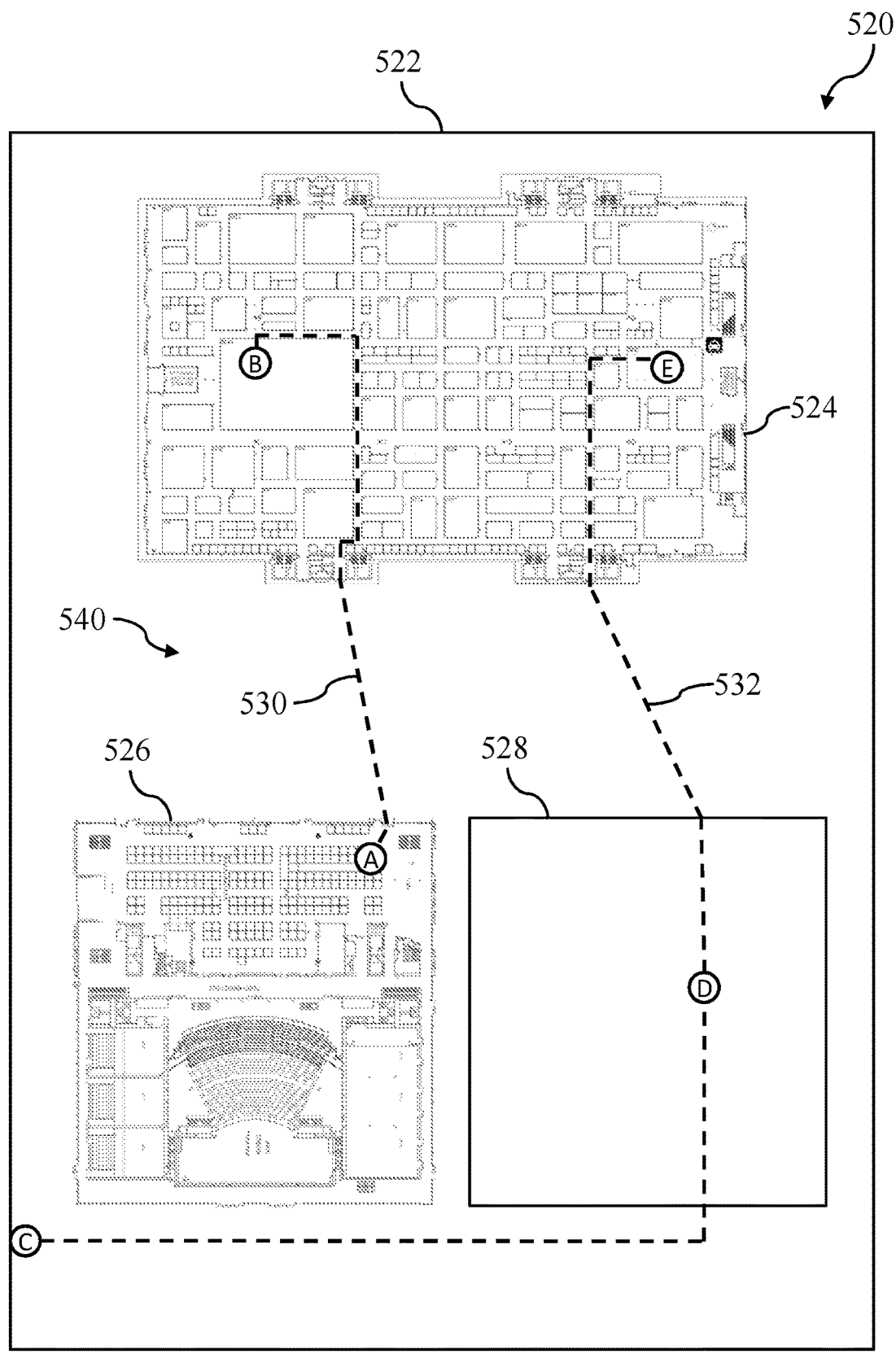
FIG. 14 is a schematic diagram illustrating an exemplary user interface showing a venue navigation view.

Additional navigational features may also be accessible via the user controls (501) in the attendee interface and may cause navigational indicators to be overlaid (462) when in use. As with prior examples, navigation features are possible within a geolocated hardscape, and may be advantageous for attendees of an event for various reasons. For example, attendees of an event often travel from elsewhere to the venue, and so may be unfamiliar with the venue itself as well as the city where the venue is located. FIG. 14 shows an example of a navigation view (520) that may be displayed by a client device such as the attendee device (110). A navigation viewer (522) may be similar to the layout viewer (502) or may be the same viewer or interface window.

In one use case, an attendee is located within a first venue building (526) at marker B and may wish to visit a booth in a second venue building (524) at marker B. The attendee may input a text search to find booth B, or may select booth B from a map view such as shown in FIG. 14. Once selected for navigation, the navigation viewer (522) may display a route (530) that the attendee may follow in order to reach booth B from their present location (e.g., booth A). The provided route (530) may include turn by turn navigation (e.g., either audible or visual), voice navigation, indication of a user's current location (e.g., as a blue dot or other visual indicator overlaid on a map) and other navigation features as will be apparent to those of ordinary skill in the art in light of this disclosure.

Of particular note, the provided route (530) provides navigation between two structures (e.g., the first building (526) and the second building (524)) and through an outdoor space (540) that is distinct from the hardscapes of the individual buildings. This differs from conventional street level navigation across roads and highways because the route (530) begins within a first structure, provides navigation based on the geolocated hardscape and softscape features of that structure to reach the outdoor space (540), and then provides additional navigation to arrive at and enter the second structure based on the geolocated hardscape and softscape features of the second structure. Once inside the second structure, the route (530) provides navigation within that structure based on the geolocated hardscape and softscape features of that structure. Since the navigation accounts for both hardscape and softscape of the venue, the route (530) can be dynamically provided based on a particular event, rather than just being generally associated with the venue. For example, where two different events have different booth layouts and different walkways, the provided navigation can account for such softscape differences instead of relying on statically positioned booths and walkways. As another example, where certain doors or other features (e.g., a restroom) of a venue may be blocked off or unavailable for use during certain events, the provided navigation can direct a user to doors or other features that are designated for use instead of relying on a static set of available doors or other features.

In a second use case, a user may be traveling to the area of the venue from an origin location indicated by the marker C. The user may be walking, driving, using public transit, or other options, and may receive correspondingly appropriate navigation based upon a selection of their transit type. Where a user is driving to the venue, a route (532) may be provided that directs the user to a parking area (528) that has been designated (e.g., as softscape information associated with the venue for that event) for parking for the event. Once parked in the parking area (528), the navigation viewer (522) may provide a visual indicator such as the marker D to indicate where, within the parking area (528), that the user left their vehicle and proceeded on foot. The route (532) may direct the user to exit the parking area (528) and proceed to a designated entrance to the second building (524), and then provide aisle by aisle directions to a selected booth indicated by marker E as has been described.

As can be seen, the navigation provided by the system (10) can be inter-building (e.g., from a first booth to a second booth or a restroom within one building), intra-building (e.g., from an origin in a first building to a destination in a second building), or city-wide (e.g., from any origin point to a venue building while accounting for method of transit, parking, and other concerns).

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A system for managing an event space comprising:
   (a) a management server including a processor; and
   (b) a user device;
   wherein the processor is configured to:
   (i) receive a hardscape dataset and a geolocation associated with the event space;
   (ii) associate a hardscape of the hardscape dataset with a set of global positioning system (GPS) coordinates to produce a geolocated hardscape, wherein the geolocated hardscape includes a plurality of hardscape positions that are each associated with a GPS coordinate of the set of GPS coordinates;
   (iii) apply a softscape to the hardscape based on a softscape dataset to produce a layout of the event space, wherein the softscape includes a plurality of softscape positions that correspond to the plurality of hardscape positions, and a plurality of booth definitions that each describe a booth space located within the softscape;
   (iv) cause a builder interface to display on the user device, wherein the builder interface includes visual representations of the layout, and is usable to:
      (A) modify a booth definition of the plurality of booth definitions to change its size, shape, and position within the softscape; and
      (B) associate a set of event information with the booth definition;
   (v) cause the builder interface to display on a plurality of user devices in parallel;
   (vi) receive an indication from the user device that the booth definition has been selected;
   (vii) lock the booth definition with respect to other user devices of the plurality of user devices by preventing modification of the booth definition or changes to the set of event information from those other user devices;
   (viii) while the booth definition is locked, display a visual indication that the booth definition is locked on the builder interface of the other user devices; and
   (ix) receive an indication from the user device that the booth definition has been unselected and unlock the booth definition in response.

2. The system of claim 1, wherein the processor is further configured to provide an attendee interface to a plurality of attendee devices that causes each attendee device to:
   (i) display the layout, wherein the layout includes descriptions for each of the plurality of booth definitions based on the set of event information; and
   (ii) display a position of that attendee device on the layout based on the output of a GPS device of that attendee device and the association between the geolocated hardscape and the set of GPS coordinates.

3. The system of claim 2, wherein the attendee interface causes an attendee device to:
   (i) provide navigation from an origin to an entrance to the event space based upon the output of the GPS device of the attendee device; and
   (ii) provide navigation from the entrance to a particular booth space within the event space based upon the output of the GPS device of the attendee device and the association between the geolocated hardscape and the set of GPS coordinates.

4. The system of claim 2, wherein the attendee interface causes an attendee device to:
   (i) provide navigation from a particular booth space within a first building of the event space to an exit of the first building based upon the output of the GPS device of the attendee device and the association between the geolocated hardscape and the set of GPS coordinates;
   (ii) provide navigation from the exit of the first building to an entrance of a second building of the event space based upon the output of the GPS device of the attendee device; and
   (iii) provide navigation from the entrance of the second building to a second particular booth space within the second building based upon the output of the GPS device of the attendee device and the association between the geolocated hardscape and the set of GPS coordinates.

5. The system of claim 1, wherein the processor is further configured to:
   (i) store state information for the builder interface for each of the plurality of user devices; and
   (ii) when any booth definition of the plurality of booth definitions is modified, push the modified booth definition to the plurality of user devices based upon the state information.

6. The system of claim 1, wherein the processor is further configured to:
   (i) receive GPS data from a second plurality of user devices located within the event space during an event; and
   (ii) for each of the second plurality of user devices, determine a timeline describing where that user device was located within the event space at each time.

7. The system of claim 6, wherein the processor is further configured to:
   (i) for a particular user device of the second plurality of user devices, identify a set of contacted user devices from the second plurality of user devices based upon the timeline for the particular user device and the timelines for the set of contacted user devices;
   (ii) identify a set of contacted booths based upon the timeline for the particular user device and the plurality of booth definitions; and
   (iii) provide a plurality of electronic notifications based upon the set of contacted user devices and the set of contacted booths.

8. The system of claim 1, wherein the processor is further configured to, when applying the softscape to the hardscape:

23

(i) determine a max fit softscape based upon the softscape dataset, wherein the max fit softscape describes a maximum number of booths that may be placed in the event space;
(ii) modify the max fit softscape based upon a set of softscape criteria specifying a minimum number of booths of a particular size; and
(iii) use the modified max fit softscape as the softscape.

9. The system of claim 1, wherein the processor is further configured to, when applying the softscape to the hardscape, associate a sequential list of identifiers with the plurality of booth definitions, wherein each identifier of the sequential list of identifiers is associated with a spatial location within the event space.

10. The system of claim 9, wherein the processor is further configured to, in response to a modification of the plurality of booth definitions that changes the total number of the plurality of booth definitions:
(i) when adding a new booth definition, associate an unused identifier from the sequential list of identifiers with the new booth definition while maintaining the spatial location associations of each of the plurality of booth definitions; and
(ii) when removing a removed booth definition due the combination of two or more of the plurality of booth definitions into a combined booth definition, associate one of the combined identifiers from the sequential list of identifiers with the combined booth definition while maintaining the spatial location associations of each of the plurality of booth definitions.

11. The system of claim 1, wherein the processor is further configured to validate each of the plurality of booth definitions after applying the softscape, and in response to any modification of the plurality of booth definitions.

12. The system of claim 11, wherein the processor is further configured to, when validating each of the plurality of booth definitions:
(i) identify a set of non-standard booths from the plurality of booth definitions based upon deviation from a configured set of standard sizes, or a configured set of standard shapes;
(ii) identify a set of spatially conflicting booths from the plurality of booth definitions based upon being within a configured proximity to a softscape feature of the softscape or a hardscape feature of the hardscape;
(iii) identify a set of distancing violations based on the plurality of booth definitions and the hardscape; and
(iv) provide a notification to the user device describing the set of non-standard booths, the set of spatially conflicting booths, and the set of distancing violations.

13. The system of claim 11, wherein the processor is further configured to, when validating each of the plurality of booth definitions:
(i) identify a set of safety features of the event space based on the hardscape dataset, wherein the set of safety features includes an evacuation path;
(ii) receive a set of safety requirements that define spatial requirements relating to the access and use of the set of safety features, wherein the set of safety requirements includes a configured minimum distance that any softscape feature must be from the evacuation path; and
(iii) determine whether any softscape feature violates the set of safety requirements and, in response, provide a notification to the user device describing the violation.

14. The system of claim 1, wherein the processor is further configured to cause a second plurality of user devices to display:

24

(i) a visual representation of the layout;
(ii) a plurality of booths positioned on the layout based on the plurality of booth definitions;
(iii) a textual description of each of the plurality of booths that describes a vendor or a product associated with that booth based on the set of event information for that booth; and
(iv) a set of symbols positioned on the layout based on the hardscape dataset, wherein the set of symbols include at least a restroom symbol and a fire exit symbol.

15. A method for managing an event space comprising, by a processor:
(a) receiving a hardscape dataset and a geolocation associated with the event space;
(b) associating a hardscape of the hardscape dataset with a set of global positioning system (GPS) coordinates to produce a geolocated hardscape, wherein the geolocated hardscape includes a plurality of hardscape positions that are each associated with a GPS coordinate of the set of GPS coordinates;
(c) applying a softscape to the hardscape based on a softscape dataset to produce a layout of the event space, wherein the softscape includes a plurality of softscape positions that correspond to the plurality of hardscape positions, and a plurality of booth definitions that each describe a booth space located within the softscape;
(d) causing a builder interface to display on a user device, wherein the builder interface includes visual representations of the layout, and is usable to:
(i) modify a booth definition of the plurality of booth definitions to change its size, shape, and position within the softscape; and
(ii) associate a set of event information with the booth definition;
(e) displaying the builder interface on a plurality of user devices in parallel;
(f) receiving an indication from the user device that the booth definition has been selected;
(g) locking the booth definition with respect to other user devices of the plurality of user devices by preventing modification of the booth definition or changes to the set of event information from those other user devices;
(h) while the booth definition is locked, displaying a visual indication that the booth definition is locked on the builder interface of the other user devices; and
(i) receiving an indication from the user device that the booth definition has been unselected and unlock the booth definition in response.

16. The method of claim 15, further comprising causing an attendee device to:
(a) display the layout, wherein the layout includes descriptions for each of the plurality of booth definitions based on the set of event information; and
(b) display a position of that attendee device on the layout based on the output of a GPS device of that attendee device and the association between the geolocated hardscape and the set of GPS coordinates.

17. The method of claim 15, further comprising:
(a) receiving GPS data from a second plurality of user devices located within the event space during an event;
(b) for each of the second plurality of user devices, determining a timeline describing where that user device was located within the event space at each time; and
(c) for a particular user device of the second plurality of user devices:

(i) identifying a set of contacted user devices from the second plurality of user devices based upon the timeline for the particular user device and the timelines for the set of contacted user devices; and (ii) identifying a set of contacted booths based upon the timeline for the particular user device and the plurality of booth definitions.

* * * * *